United States Patent [19]

Iwamoto et al.

[11] Patent Number: 5,722,703
[45] Date of Patent: Mar. 3, 1998

[54] POP-UP MECHANISM

[75] Inventors: Takashi Iwamoto, Machida; Eiji Ueno, Utsunomiya, both of Japan

[73] Assignee: NIFCO Inc., Yokohama, Japan

[21] Appl. No.: 645,570

[22] Filed: May 14, 1996

[30] Foreign Application Priority Data

Jul. 27, 1995 [JP] Japan .................. 7-211185

[51] Int. Cl.$^6$ .................................................. E05C 19/00
[52] U.S. Cl. ............................... 292/1; 292/95; 248/118
[58] Field of Search ........................... 292/1, 95, 109, 292/DIG. 43, 262, 278, DIG. 5, DIG. 11; 248/118

[56] References Cited

U.S. PATENT DOCUMENTS

| | | | |
|---|---|---|---|
| 554,488 | 2/1896 | Hofmeister | 248/118 |
| 4,674,790 | 6/1987 | Johnson | 248/118 |
| 4,828,323 | 5/1989 | Brodersen | 248/118 |
| 4,886,317 | 12/1989 | Konzmann | 297/417 |
| 5,076,645 | 12/1991 | Yokota | 297/417 |

*Primary Examiner*—Steven N. Meyers
*Assistant Examiner*—Gary Estremsky
*Attorney, Agent, or Firm*—Kanesaka & Takeuchi

[57] ABSTRACT

A pop-up mechanism is formed of a main frame, supporting poles rotatably coupled to the main frame, an elevating member rotatably attached to the supporting poles, an urging device for urging the supporting poles to rotate in a stand-up direction, and a locking device for locking the elevating member in a pop-up state and in a folded state. The locking device includes a locking piece slidably attached to the elevating member and having a lock releasing projection and a locking hole; a locking member rotatably attached to one of the supporting poles and having a locking pawl; and a locking projection projecting from the main frame. The locking projection is engaged with a locking hole of the locking piece to lock in the folded state, and the locking pawl of the locking member is engaged with a locking dent formed in the elevating member to lock in the pop-up state. When the locking piece is pushed, the locking conditions in the folded state and the pop-up state are released.

9 Claims, 24 Drawing Sheets

POP-UP MECHANISM

BACKGROUND OF THE INVENTION AND RELATED ART STATEMENT

The present invention relates to a pop-up mechanism preferably used as a height adjusting mechanism which is incorporated into an armrest provided on a center console box or an armrest provided on a rear seat of a vehicle. More particularly, it concerns a pop-up mechanism where an elevating member is rotatably attached to a plurality of supporting poles rotatably provided to a main frame to constitute a link mechanism, and the elevating meter is elevated or lowered by rotating the supporting poles to stand up or arrange horizontally.

Conventionally, in a vehicle, a center console box a as shown in FIG. 23 as provided between a driver's seat and a passenger's seat. Recently, an elevating member (not shown in FIG. 23) elevated or lowered by a button operation is provided to a lid b of the center console box a, and the lid b for closing and opening the console box a can also be used as an armrest by elevating the elevating member. Incidentally, in FIG. 23, e represents a cover for covering an upper side of the lid b, and the elevating member is provided between the cover e and the lid b.

For such a console box used as an armrest, a pop-up mechanism is installed for elevating or lowering the elevating member as shown in FIGS. 24 to 26. More specifically, supporting poles c, d with a predetermined interval therebetween are collapsibly or foldably attached on the lid b of the console box a, and an elevating member f provided with the cover e is rotatably coupled to upper end portions of the supporting poles c, d to constitute a link mechanism. Torsion springs g are disposed between the supporting poles c, d and base portions g of the supporting poles c, d fixed to the lid b to thereby urge the supporting poles c, d in the standing-up direction. Also, a long plate-shape locking piece i for locking in a folded state (shown in FIG. 24) where the supporting poles c, d are arranged horizontally or collapsed and in a pop-up state (shown in FIG. 25) where the supporting poles c, d stand up vertically, is attached to the elevating member f to be slidable in the front and rear directions (left and right directions in the drawing) and to be urged in the front direction by a coil spring j.

As shown in FIG. 24, in the folded state where the supporting poles c, d are collapsed against the urging force of the torsion springs h on the lid b, a forward end portion, formed in a hook shape, of a locking projection k projecting from an upper surface of the lid b engages a locking hole m formed in the locking piece i, so that the pop-up mechanism is locked in the folded state against the urging force of the torsion springs h. At this time, the locking piece i is positioned at a front or forward (left side in the drawing) limit by the urging force of the coil spring j, and a locking projection n projecting from a forward end thereof is inserted into a dent portion o having a right-angled fan-shape in its section and formed on an upper end portion of the front supporting pole c.

In case the elevating member f is elevated from the above condition to be used as an armrest, a lock releasing piece s extending from a forward end portion of the locking piece i and projecting outwardly from the cover e is pushed in a direction P1. Then, as shown in FIG. 26(A), the locking piece i slides rearwardly (right side in the drawing), and an engaging state between an edge portion of the locking hole m provided in the locking piece i and the locking projection k is released to thereby release the locking state.

Through this operation, both the supporting poles c, d are rotated in a stand-up direction by the urging force of the torsion springs h, and the elevating member f is elevated by the action of the link mechanism. At this time, as shown in FIG. 26(B), by releasing the pushing force P1, the locking projection n of the locking piece i which has been moved forwardly (left side in the drawing) by the urging force of the coil spring j is pushed rearwardly by an inner surface of the dent portion o through rotating movement of the supporting pole c to thereby slide the locking piece i rearwardly again. Then, when the supporting pole c is rotated to the upright state, an engaging dent portion r formed in an inner surface of an upper end portion of the supporting pole c and the locking projection n coincide with each other. As a result, as shown in FIG. 25, the locking piece i is again moved forwardly (left side in the drawing) by the urging force of the coil spring j, and the locking projection n is inserted into the engaging dent portion r to engage with each other, so that locking is made in the pop-up state where the supporting poles c, d stand up.

Further, in case the pop-up state is returned to the folded state, as shown in FIG. 24, while lowering the elevating member f, the lock releasing piece s is again pushed in the direction P2 (FIG. 25), and as shown in FIG. 26(C), the locking piece i slides rearwardly (right side in the drawing). Through this operation, the locking projection r provided on the locking piece i is ejected from the engaging dent portion r of the supporting pole c to thereby release the locking state.

In this state, the elevating member f is pressed down while both the supporting poles c, d are rotated rearwardly by an action of the link mechanism to thereby fold or collapse the elevating member, so that the elevating member f is lowered. As shown in FIG. 26(D), through releasing of the pushing force P2, the locking piece i is moved forwardly (left side in the drawing). Thus, as the locking piece i is pushed down, a forward end portion of the locking projection k abuts against a tapered portion formed on a lower surface side of a rear edge portion of the locking hole m of the locking piece i. In the state, by further pressing down the elevating member f in the direction P3, the locking piece i is once slid rearwardly by the action of the tapered portion so that the locking projection k is inserted into the locking hole m, and then, the locking piece i is again slid forwardly by the urging force of the coil spring j. Therefore, as shown in FIG. 24, the locking projection k and the locking hole m engage with each other to thereby lock in the folded state.

As described above, according to the pop-up mechanism, by pushing the lock releasing piece s, the elevating member f is automatically elevated, so that the lid b of the center console box a can be favorably used as an armrest. After use, by pushing the lock releasing piece s, the locking state is released and at the same time the elevating member f is lowered, so that the pop-up mechanism can be kept in a folded state.

However, in the conventional pop-up mechanism, there has been a problem that the elevating member f is liable to wobble, i.e. not stable, at the time of the popping-up condition.

More specifically, in the pop-up mechanism as described above, the locking projection n of the locking piece i is inserted into the engaging dent portion r formed in an upper end portion of the supporting pole c to thereby lock the elevating member f in the pop-up state. However, the locking piece i is formed slidably relative to the elevating member f, and in order to obtain a good sliding movement, a predetermined clearance is provided between the elevating member f and the locking piece i. Thus, the locking piece i itself wobbles or moves, which results in wobbling of the elevating member f.

Also, in order to obtain a good engaging movement between the locking projection n and the inner surface of the engaging dent portion r, a predetermined clearance is set, which causes wobbling. Further, the engagement between the locking projection n and the engaging dent portion r is taken place near a rotating shaft between the supporting pole c and the elevating member f, so that even if the wobbling between the locking projection n and the engaging dent portion r is small, the wobbling is amplified at the elevating member f to thereby become large wobbling. Further, since wobbling of the locking piece i itself is added thereto, the wobbling of the elevating member f may become so large as to hurt using as an armrest.

Also, when the pop-up mechanism is changed from the pop-up state to the folded state, a releasing operation of the locking state may not be carried out smoothly. More specifically, in the pop-up state, as described above, the locking projection n of the locking piece i is inserted into and engaged with the engaging dent r of the supporting pole c to thereby prevent the rotating movement between the elevating member f and the supporting pole c, so that the elevating member f is locked. However, in a state where a pressing-down force is applied to the elevating member f, i.e. an armrest normally being in this state, since an arm is placed on the elevating member f, a large force for rotating the supporting pole c relative to the elevating member f is applied. Thus, the locking projection n may be strongly clamped into the engaging dent r, so that even if the lock releasing piece s is pushed in the direction P2, the locking state may not be easily released.

Moreover, since the engagement between the locking projection n and the engaging dent r takes place near the rotating shaft between the supporting pole c and the elevating member f, a force for pressing down the elevating member f becomes very large by a lever action and acts between the locking projection n and the engaging dent r which are engaged with each other. Therefore, a great shearing force is created, and the locking projection n may be broken.

The present invention has been made in view of the above situation and problems.

One object of the invention is to provide a pop-up mechanism in which an elevating member is rotatably attached to a plurality of supporting poles rotatably provided on a main frame to thereby constitute a link mechanism, and by standing up or folding the supporting poles, the elevating member is elevated or lowered to constitute a pop-up mechanism, wherein locking is positively carried out without wobbling in a pop-up state where the supporting poles stand up and the elevating member is in an upper limit.

Another object of the invention is to provide a pop-up mechanism as stated above, wherein the lock releasing operation can be easily and positively carried out from the locked condition in the pop-up state.

A further object of the invention is to provide a pop-up mechanism as stated above, wherein there is no possibility of breaking the locking member and locking can be positively carried out in the pop-up state.

Further objects and advantages of the invention will be apparent from the following description of the invention.

SUMMARY OF THE INVENTION

In order to attain the above objects, a pop-up mechanism of the invention is formed of a main frame; a plurality of supporting poles, one end of which is rotatably coupled to an upper portion of the main frame and which is collapsible or foldable over the upper portion of the main frame; an elevating member rotatably attached to the other end of the supporting poles; an urging device for urging the supporting poles to rotate in a stand-up direction; and a locking device for locking the supporting poles in a folded state where the supporting poles collapse or are folded over the main frame and in a pop-up state where the supporting poles stand up on the main frame.

In the folded state where the supporting poles are collapsed over the main frame and locked by the locking device, when the locked state by the locking device is released, the supporting poles are rotated by the urging device to stand up. In the pop-up state, the supporting poles are locked by the locking device, so that the elevating member is held in the pop-up state where the elevating member is elevated from the main frame. In the pop-up state, when the locking device is released and the supporting poles are pushed against the urging force of the urging device, the supporting poles are folded and are locked by the locking device in the folded state where the supporting poles are collapsed over the main frame.

In the pop-up mechanism thus structured, the locking device includes a plate-shape locking piece slidably attached to the elevating member and urged to slide in one direction, and having a lock releasing projection and a locking hole; a locking member rotatably attached to the upper portion of one of the supporting poles and urged to rotate a forward end toward the elevating member, the locking member having a locking pawl at the forward end thereof; and a locking projection projecting from the upper surface of the main frame and having a locking pawl at a forward end portion thereof. In the folded state, the locking pawl of the locking projection engages the locking hole of the locking piece to thereby lock in the folded state, and by sliding the locking piece against the sliding force, the engaging state between the locking hole and the locking projection is released. The locking pawl of the locking member engages a locking dent formed in a lower surface of the elevating member to thereby lock in the pop-up state, and by sliding the locking piece against the sliding force, the lock releasing projection of the locking piece abuts against a forward end portion of the locking member and rotates the locking member against the urging force of the spring to thereby release the engaging state between the locking pawl of the locking member and the locking dent of the elevating member.

In the pop-up mechanism according to the present invention, in the same manner as described above regarding the conventional mechanism, the elevating member is rotatably attached to the upper end portions of the plural supporting poles, which are collapsibly or foldably attached to the upper surface of the main frame to thereby constitute the link mechanism. By urging the supporting poles to rotate in the stand-up direction through the urging device, the supporting poles are rotated in the stand-up direction by the urging force from the folded state where the supporting poles are collapsed or folded over the main frame. Thus, the supporting poles are automatically changed to the pop-up state where the supporting poles stand up. Also, by the locking device having the plate-shape locking piece slidably attached to the elevating member, the pop-up mechanism can be locked in the folded state and the pop-up state.

In the pop-up mechanism according to the present invention, the locking pawl provided at the forward end of the locking member rotatably attached to the upper portion of one of the supporting poles is engaged with the locking dent provided in the lower surface of the elevating member to thereby lock in the pop-up state, so that locking in the pop-up state can be positively carried out without wobbling. Also, the locking member is rotated by the lock releasing projection provided on the locking piece to thereby release the locking condition in the pop-up state, so that even in a state where a pressing force is applied to the elevating member, the locking condition can be easily and positively released.

More specifically, since the forward end portion of the locking member, which is rotatably attached to one of the supporting poles at the other end, is engaged with the lower surface of the elevating member to thereby lock in the pop-up state, the rotating movement between the elevating member and the supporting pole is prevented by connecting two points between the elevating member and the supporting pole away from a rotating shaft to a certain extent to thereby lock these members. Therefore, even if some clearance is provided at the connecting portion between the locking member and the supporting pole and at the engaging portion between the locking member and the elevating member to smoothly rotate or engage with each other, the elevating member does not wobble by amplifying the wobbling at these points. The wobbling is rather reduced, and wobbling does not substantially occur in the elevating member.

Further described in detail, in a four-point link mechanism, as a distance between mutually separated two points with a rotating point therebetween increases, a relative moving distance when a linking movement is carried out becomes large. In case the two points are separated to a certain extent, the relative moving distance between the two points becomes larger than that between mutually facing two sides. Therefore, even if the distance between the two points is varied to some extent, the distance between the mutually facing two sides does not change too much. In the locking device according to the present invention, such two points are connected by the locking member. Thus, even if some wobbling is created between the two points, almost no wobbling is created between the elevating member and the main frame corresponding to the mutually facing two sides.

Also, as the two points are not formed close to the rotating shaft where a force applied to the elevating member is amplified by a lever action, the force is not concentrated at the two points to be locked. Moreover, since the locking member for constituting the locking device according to the present invention can be formed with a strength higher than the locking projection k in the conventional example, there is no risk of the locking member being broken, and locking in the pop-up state can be positively carried out.

Further, in the locking mechanism of the present invention, the locking member for locking in the pop-up state is pushed by the lock releasing projection projecting from the locking piece slidably provided on the elevating member, so that the locking member is rotated against the urging force of the spring to thereby release the engagement between the elevating member and the locking member. Therefore, in the pop-up state, even if a pressing-down force is applied to the elevating member, the sliding movement of the locking piece is not disturbed, and the locking state can be easily released.

More specifically, in the present invention, in case locking in the pop-up state is released, the locking piece is operated to slide, and the lock releasing projection projecting from the locking piece abuts against the forward end side of the locking member to thereby press the locking member downwardly, so that the locking member is rotated against the urging force of the spring and is pushed in a direction where the forward end side of the locking member is separated from the elevating member. With this operation, the engagement state between the forward end portion of the locking piece and the elevating member is released to thereby release the locking state. Accordingly, even if the pressing-down force is applied to the elevating member, a locking action is carried out by the locking member, and the locking piece for releasing the locking is not involved in the locking condition. Therefore, the sliding movement of the locking piece is not disturbed by the force for pressing down the elevating member, and the lock releasing can be easily and positively carried out by smoothly sliding the locking piece.

Incidentally, in case the locking in the pop-up state is released by sliding the locking piece, the locking piece is slid against an urging force applied in a sliding direction. In this case, it is preferable that the urging force for urging the locking piece is set to be weaker than that of an urging device for urging the supporting poles in the stand-up direction, so that an operation at the time of releasing the locking can be carried out smoothly.

More specifically, in case the locking piece is slid against the urging force, the elevating member is pushed in the same direction as the sliding direction of the locking piece, and also a force for rotating the supporting poles in a collapsing direction is generated. At this time, when the urging force for urging the locking piece is strong, an urging force greater than the urging force generated by the urging device is applied to the supporting poles before the locking piece is slid against the urging force for the locking piece to thereby rotate the supporting poles. As a result, a force is applied to an engaging portion between the locking pawl at the forward end of the locking member for stopping the rotation of the supporting poles and the locking dent portion of the elevating member. Therefore, the lock releasing operation may not be smoothly performed. However, by setting the urging force for the locking piece to be weaker than that for the supporting poles by the urging device, the locking piece can be positively slid against the urging force therefor before the force for rotating the supporting poles is generated, so that the lock releasing operation can be smoothly and positively carried out.

Also, the locking pawl at the forward end of the locking member is inclined inwardly, and an engagement projection corresponding to the inclination of the locking pawl is formed to a lower edge portion of the locking dent portion of the elevating member to be engaged with the locking pawl. By engaging the locking pawl and the engagement projection, the locking in the pop-up state can be more strongly performed. Thus, even if a strong force is applied to the elevating member in the pop-up state, the locking pawl is positively prevented from extracting from the locking dent portion by the engagement projection to thereby improve reliability of the locking state.

In this case, the inclination of the locking pawl is formed to coincide with a rotation path of the forward end portion of the locking member, and the engagement projection is formed to coincide with the inclination. Also, the urging force for the locking piece is set to be weaker than that of the supporting poles. Accordingly, when the locking state is released by rotating the locking member, the locking pawl is not caught by the engagement projection to thereby smoothly release the locking state.

As described hereinabove, according to the pop-up mechanism of the present invention, all the defects of the conventional pop-up mechanism as described above are solved, and in the pop-up state where the supporting poles stand up and the elevating member is in the upper limit, locking can be positively carried out without wobbling, and further, from the pop-up state, the lock releasing operation can be easily and positively performed.

DETAILED DESCRIPTION OF PREFERRED EMBODIMENTS

Hereinafter, embodiments of the present invention are specifically described.

Figure 23:
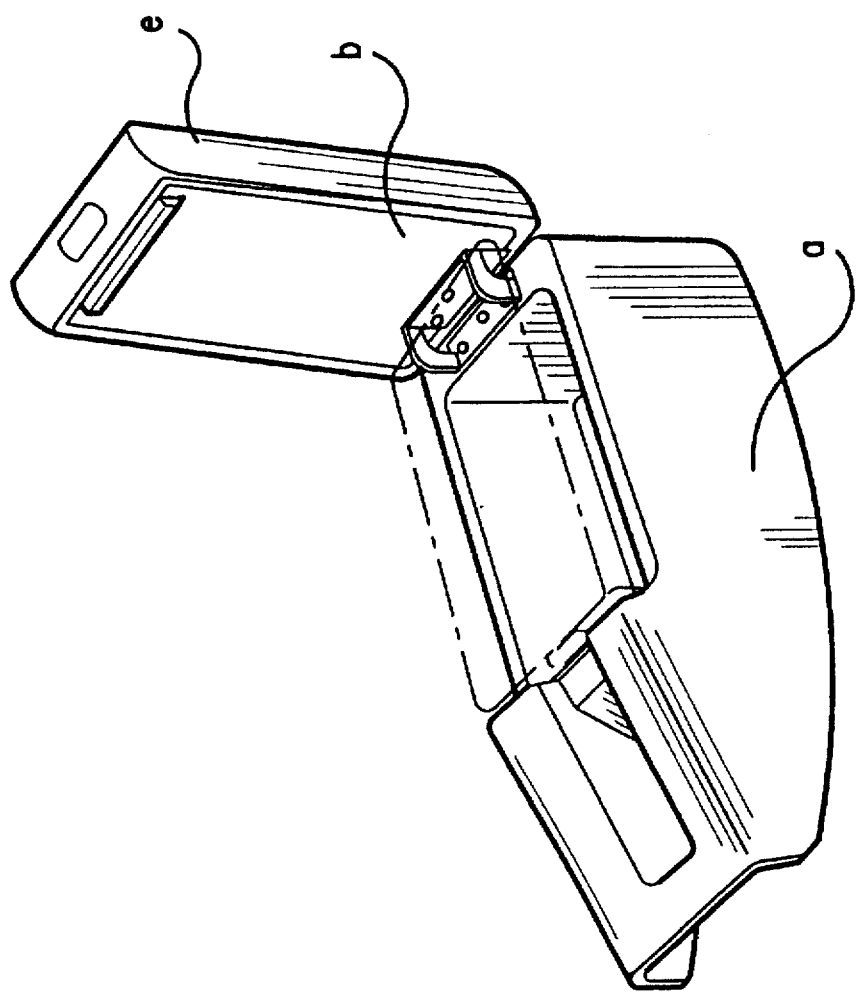
FIG. 23 is a perspective view for showing an example of a center console box in which the pop-up unit is incorporated.
Figure 24:
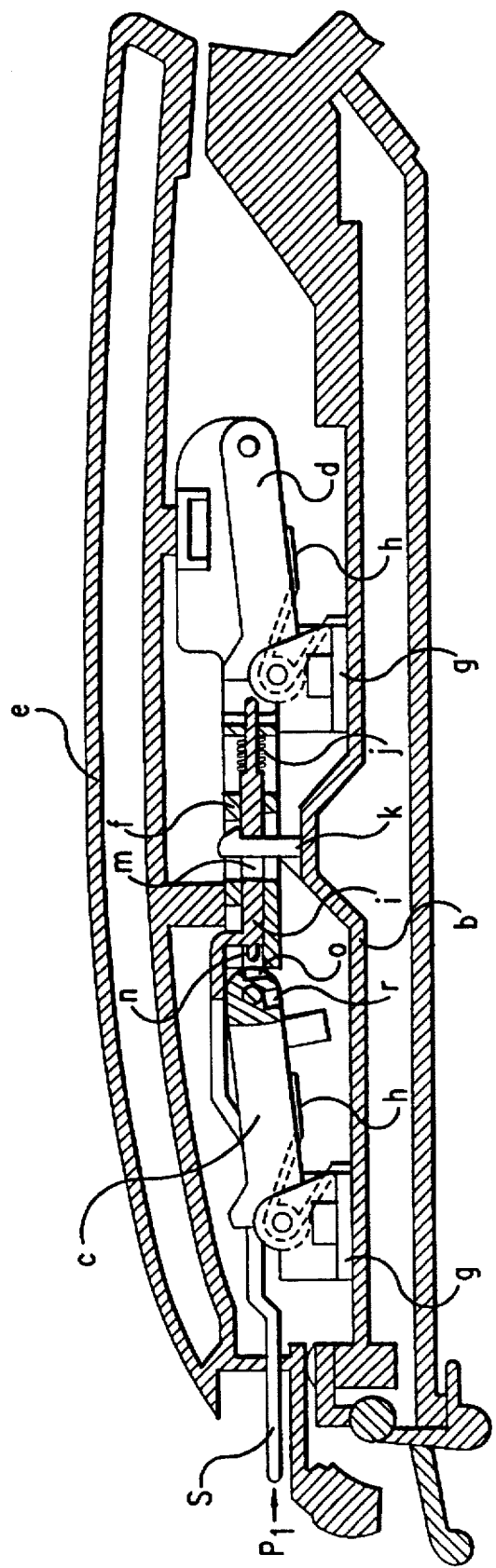
FIG. 24 is a partially cut side view for showing the folded state of a conventional pop-up mechanism.
Figure 25:
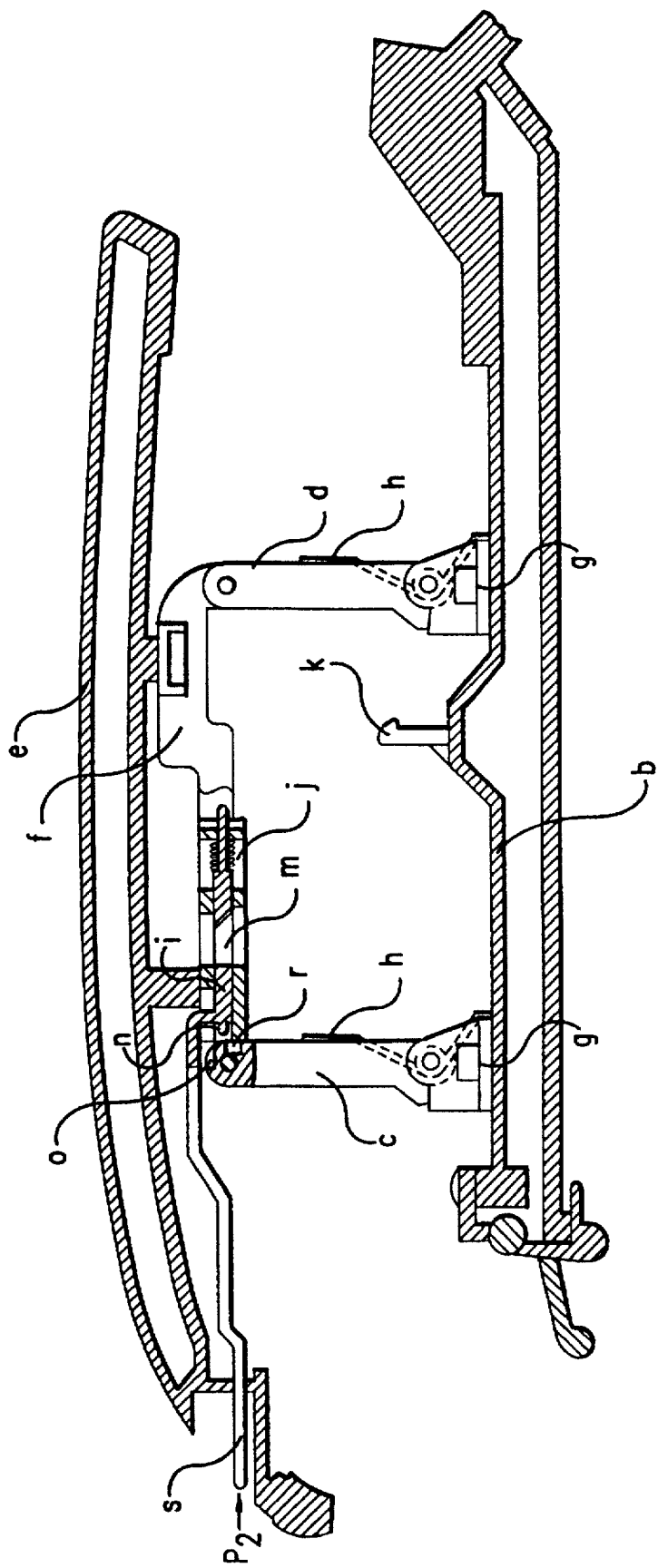
FIG. 25 is a partially cut side view for showing the pop-up state thereof.
Figure 26A:
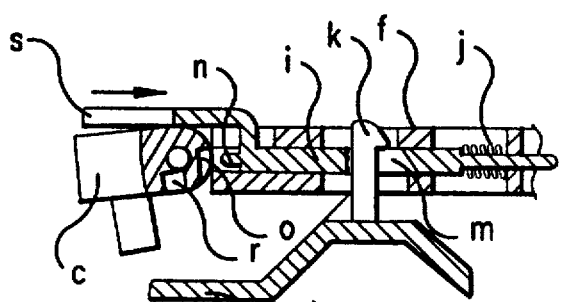
FIGS. 26(A), 26(B), 26(C) and 26(D) are enlarged sectional views for explaining a locking operation thereof.
Figure 26B:
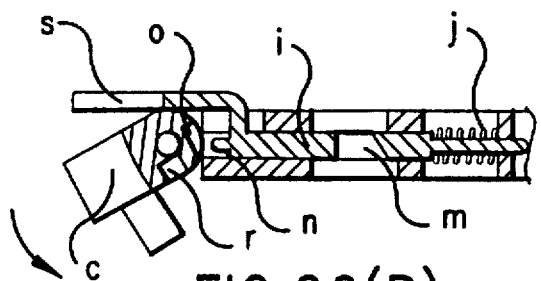
Figure 26C:
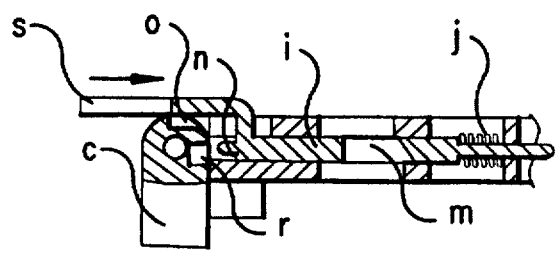
Figure 26D:
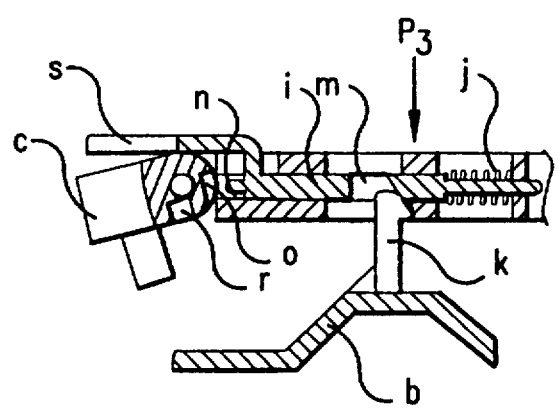

FIGS. 1 to 10 show a pop-up unit provided with a pop-up mechanism of an embodiment according to the present invention, and the pop-up unit is installed between a lid b and a cover e of a central console box a as shown in FIG. 23. The pop-up unit is formed of a main frame 1 fixed to the lid b, supporting poles 2a, 2b provided collapsibly or foldably over the main frame 1, and an elevating member 3 in a plate-like shape and rotatably connected to the upper ends of the supporting poles 2a, 2b.

The main frame 1, as shown in FIGS. 11(A), 11(B) and 12(A), 12(B), is formed of long plate-shape base portions 11 disposed parallel to each other with a predetermined space therebetween and integrally connected by a thick plate-shape connecting portion 12.

On both ends of the upper sides of the respective base portions 11 for constituting the main frame 1, mountain-shape leg connecting portions 13 with hemispherical upper ends are formed to project upwardly therefrom. Screwing projections 14 having screw holes are provided on the lateral sides of the respective leg connecting portions 13, and on the inner sides of the respective leg connecting portions 13, bearing plates 15 with semi-circular notches at upper central portions thereof are provided with a predetermined distance spaced apart from each other. Also, on the front sides (left side in the drawing) and at the intermediate portions in a height direction of the respective leg connecting portions 13, engaging step portions 16 at a time of stand-up are provided, and the respective engaging step portions 16 extend inwardly along the front edges of the base portions 11. Further, engaging step portions 17 at a time of collapsing or folding are provided adjacent to and inside the respective leg connecting portions 13 to face the engaging step portions 16.

The connecting portion 12 has square-shape holes 121, 122, 123 at a front portion, intermediate portion and rear portion, and also, a pedestal portion 124 slightly bulging upwardly is provided at a rear central portion on an upper side thereof. At a forward central portion of the pedestal portion 124, a locking projection 19 having a hook-shape locking pawl 19a at a forward end thereof is formed to project upwardly. Incidentally, in FIGS. 11(A) and 12(B), reference numeral 18 represents reinforcing ribs integrally formed on the upper sides of the base portions 11, and though not specifically shown, on both upper and lower sides of the connecting portion 12, a plurality of dents is formed to provide measurement stability and save materials at the time of formation.

As shown in FIGS. 16(A)–16(D) and 17(A)–17(D), each of the supporting poles 2a, 2b to be attached to the upper side of the main frame 1 is integrally formed of a pair of pole-shape leg portions 22 disposed parallel to and spaced apart from each other by connecting plate 23a or 23b. Each leg portion 22 has a semicircular shape at upper and lower ends with holes for inserting shafts therethrough, and an abutting step 21 at the time of the standing on a lower front side (left sides in FIGS. 16(C), 16(D) and FIGS. 17(C), 17(D)). On the upper ends of the respective connecting plates 23a, 23b, two shaft insertion projections 24 are integrally formed with a predetermined space apart from each other. Each projection 24 has a hole for inserting a shaft therethrough, and a semicircular upper portion.

Figure 16A:
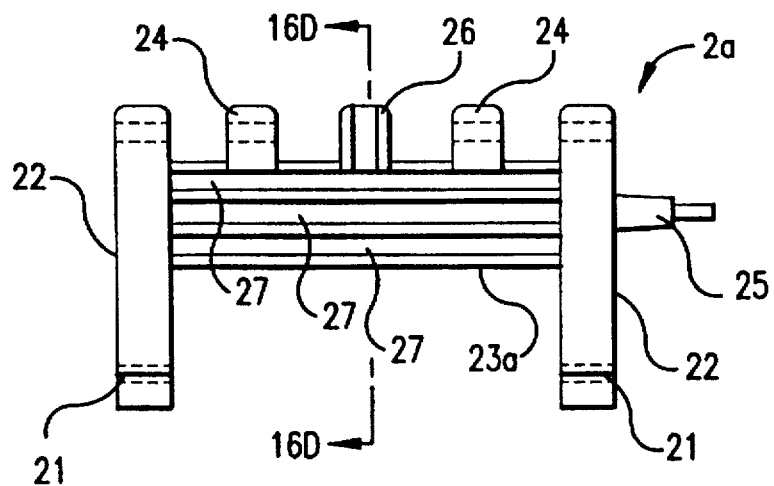
FIG. 16(A) is a front view for showing one supporting pole for constituting the pop-up unit.
Figure 16B:
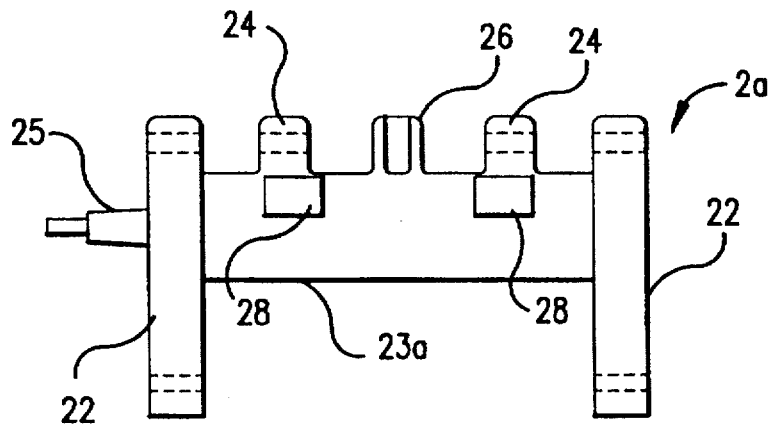
FIG. 16(B) is a rear view thereof.
Figure 16C:
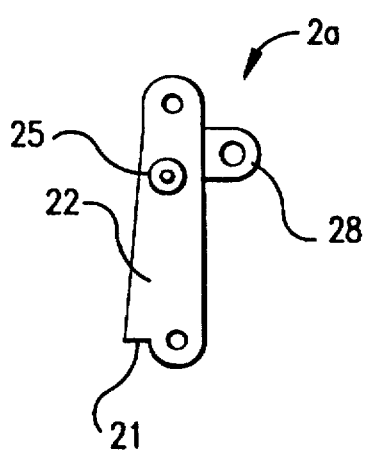
FIG. 16(C) is a side view thereof.
Figure 16D:
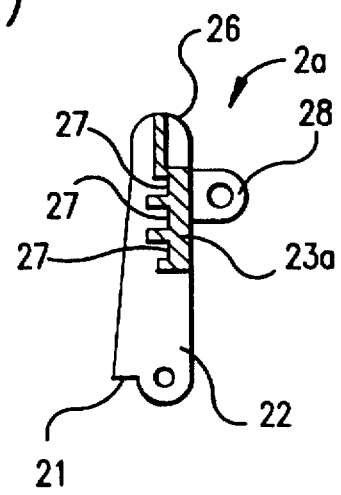
FIG. 16(D) is a sectional view taken along line 16(D)—16(D) in FIG. 16(A)
Figure 17A:
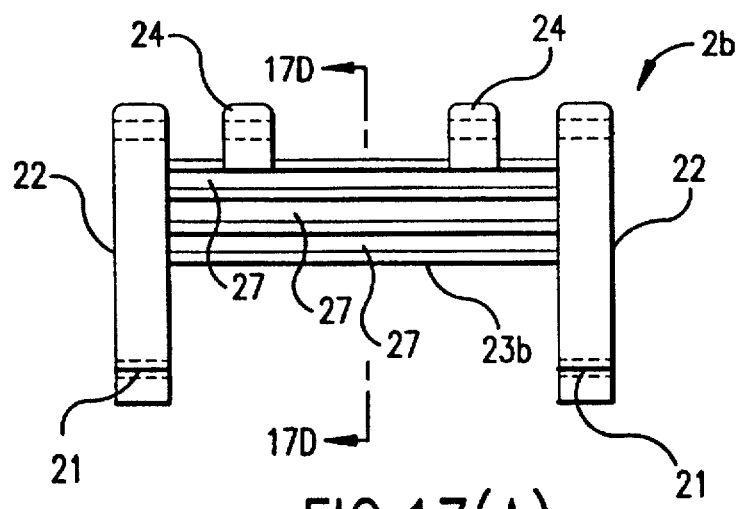
FIG. 17(A) is a front view for showing the other supporting pole for constituting the pop-up unit.
Figure 17B:
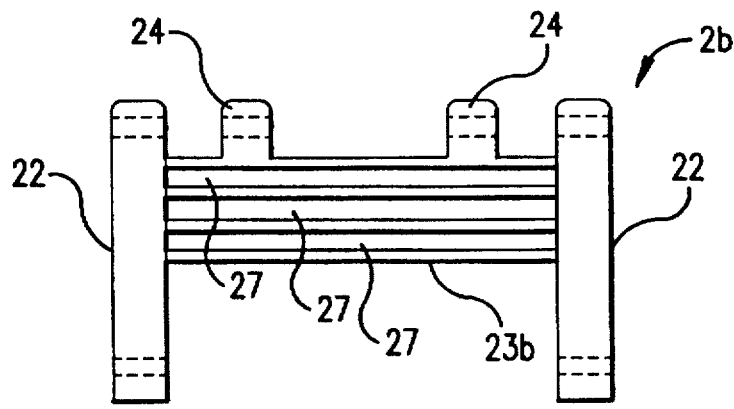
FIG. 17(B) is a rear view thereof.
Figure 17C:
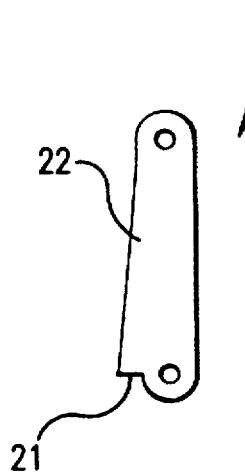
FIG. 17(C) is a side view thereof.
Figure 17D:
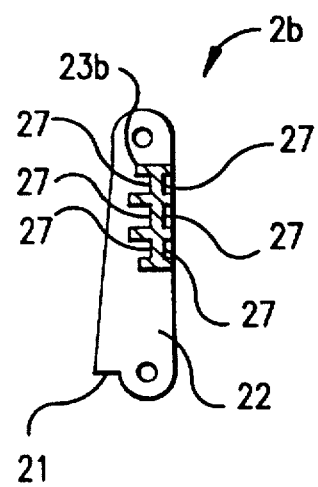
FIG. 17(D) is a sectional view taken along line 17(D)—17(D) in FIG. 17(A)

In the supporting pole 2a (left side in FIGS. 1 to 9), as shown in FIG. 16(B), a coupling shaft 25 for coupling a damper 7, described later, is formed on a side surface of one of the pole-shape leg portions 22. Also, at an upper central portion of the coupling plate 23a, a locking piece engaging projection 26 having a semicircular upper end is provided between the shaft insertion projections 24. Further, the coupling plate 23a is subjected to a lightening treatment 27 on the front side thereof (left side in FIGS. 16(C), 16(D)), and not subjected to the lightening treatment on a rear side thereof (right side in FIGS. 16(C), 16(D)), i.e. flat. Also, on an upper back surface of the coupling plate 23a, two locking member attaching projections 28 having shaft insertion holes and semicircular forward ends are integrally provided.

On the other hand, the supporting pole 2b on a rear side (right side in FIGS. 1 to 9), as shown in FIGS. 17(A)–17(D), does not have the coupling shaft 25, the locking piece engaging projection 26 and the locking member attaching projection 28, and is subjected to the lightening treatment 27 on both front and back surfaces.

The supporting poles 2a, 2b are rotatably coupled to the base portions 11 of the main frame 1 at the lower end portions thereof to be collapsible or foldable over the main frame 1. More specifically, as shown in FIGS. 1 to 7, the pole-shape leg portions 22 of the respective supporting poles 2a, 2b are rotatably attached, at the lower ends thereof, to the respective leg coupling portions 13 formed on the base portions 11 of the main frame 1, so that the supporting poles 2a, 2b are rotatably attached to the front and rear end portions on the main frame 1. In this case, shaft members 4 for coupling the leg coupling portions 13 and the pole-shape leg portions 22 are inserted into the leg coupling portions 13 provided on both ends of the base portions 11, and the respective supporting poles 2a, 2b are urged to a stand-up direction on the main frame 1 by torsion springs 41 attached to the shaft members 4.

The front supporting pole 2a has a locking member 5 attached to the locking member attaching projections 28. The locking member 5, as shown in FIGS. 18(A)–18(D), is provided with three notches 52a, 52b at a rear end portion (lower end in FIGS. 18(A), 18(B)) of a square plate-shape base plate 51; a hole 53 for inserting a shaft therethrough; and three locking pawls 54 projecting from both ends and a central portion on the upper side of the forward end portion (upper end portions in FIGS. 18(A), 18(B)). Incidentally, reference numeral 55 in FIG. 18(D) represents a projection for hooking an end portion of a torsion spring 43, described later.

Figure 1:
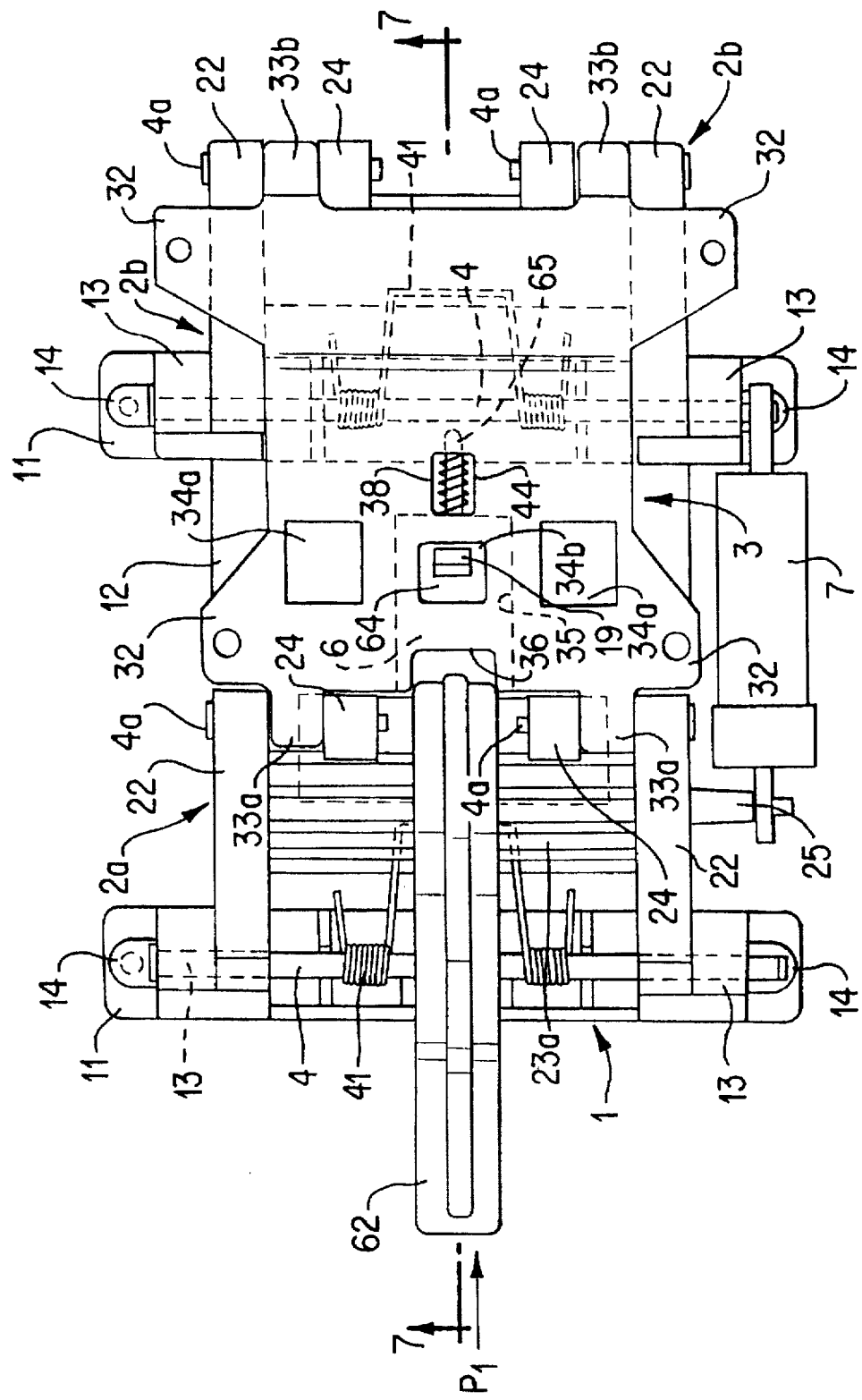
FIG. 1 is a plan view for showing a folded state of a pop-up unit using a pop-up mechanism of an embodiment according to the present invention.
Figure 2:
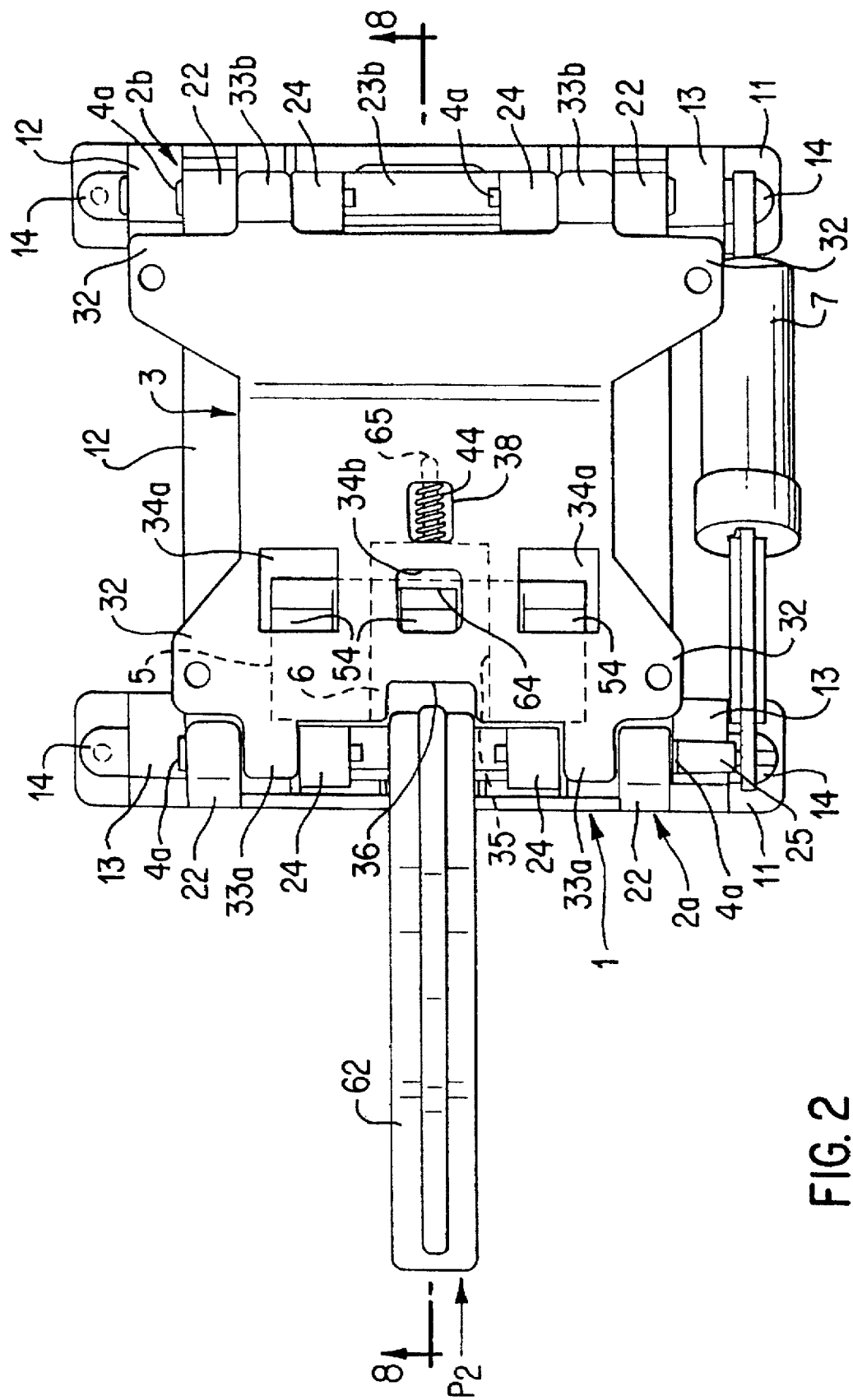
FIG. 2 is a plan view for showing a pop-up state thereof.
Figure 3:
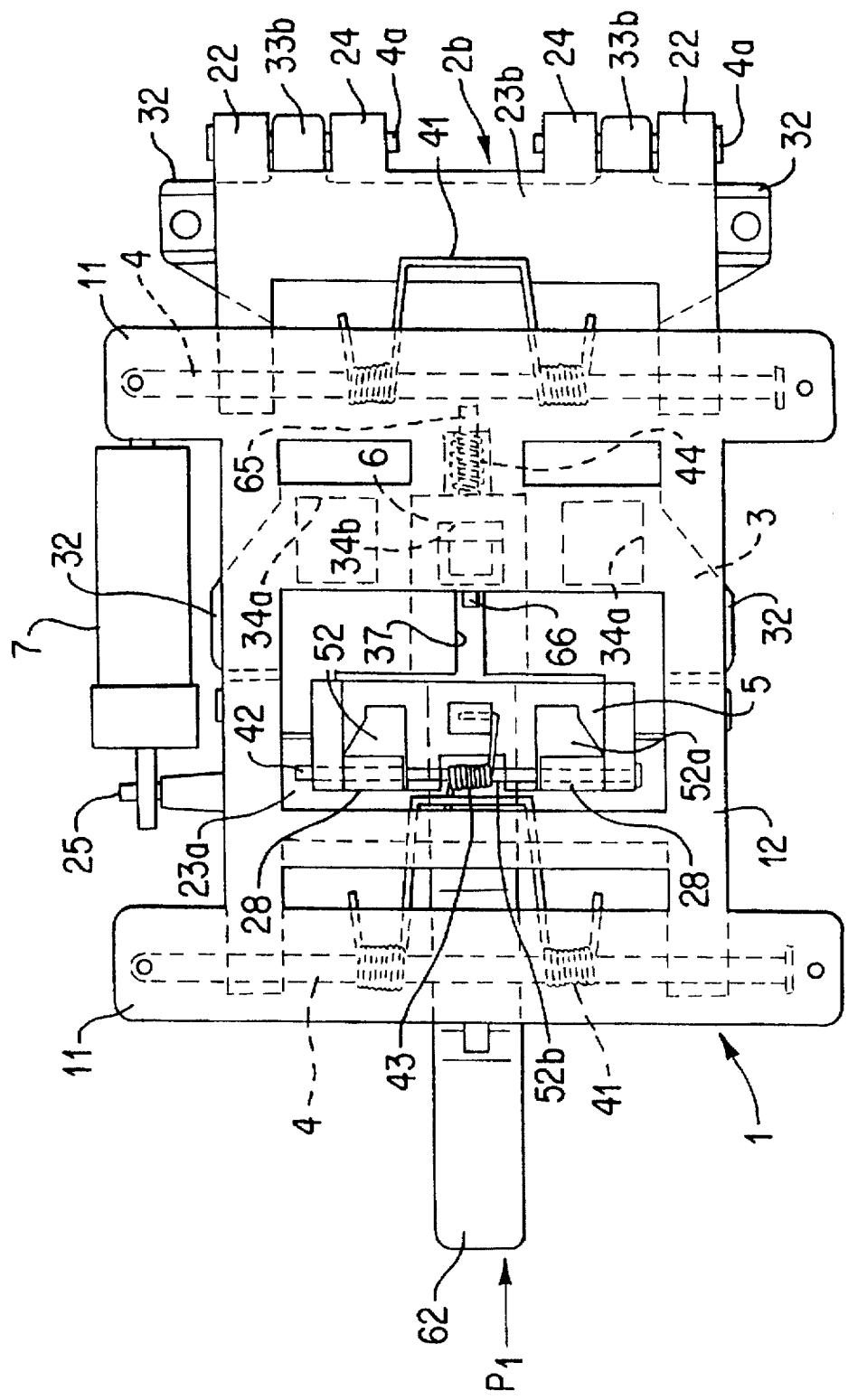
FIG. 3 is a bottom view for showing a folded state thereof.
Figure 4:
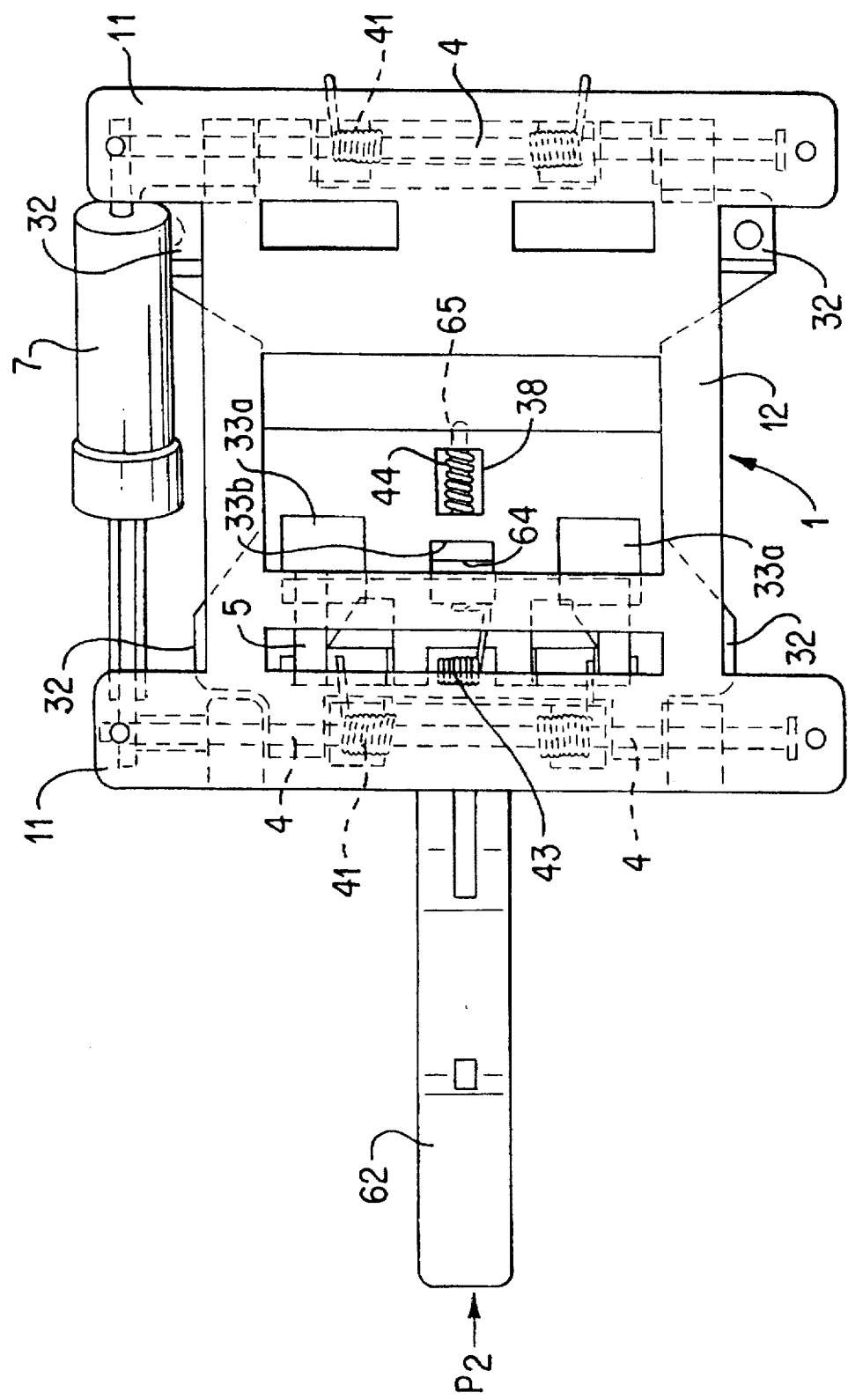
FIG. 4 is a bottom view for showing the pop-up state thereof.
Figure 9A:
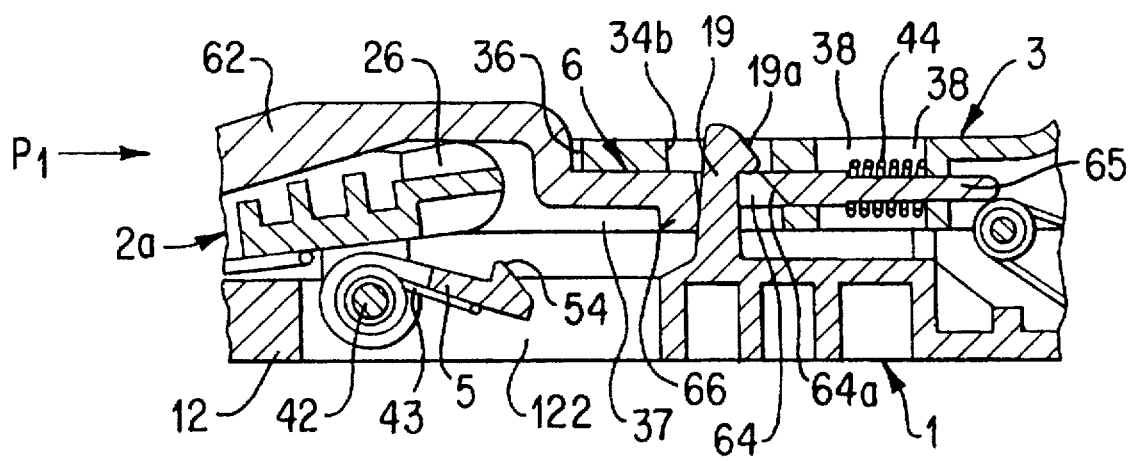
FIGS. 9(A) and 9(B) are partially enlarged sectional views for explaining intermediate movements from the folded state to the pop-up state.

As shown in FIG. 3, the locking member attaching projections 28 of the supporting pole 2a are inserted into the notches 52a so that the locking member 5 is rotatably attached to the supporting pole 2a. Also, the locking member 5 is urged to rotate upwardly (toward the elevating member 3) by the torsion spring 43 formed around a rotating shaft 42 and located in the notch portion 52b of the locking member 5. In this case, the urging force of the torsion spring 43, as shown in FIG. 9(A), is set not to function in the whole area, i.e. 180°, where the locking member 5 rotates, but to function in the area from 0° to 90° or 0° to 150°.

On the upper ends of both the supporting poles 2a, 2b, the plate-shape elevating member 3 is rotatably attached.

The elevating member 3, as shown in FIGS. 13(A), 13(B) and FIGS. 14(A), 14(B), is formed of a plate-shape base portion 31 bent in a crank shape at an intermediate portion thereof, and attaching pieces 32 with screw holes integrally formed with the base portion 31 to extend outwardly at the front and rear ends on both sides thereof. Also, the elevating member 3 is integrally formed with coupling projections 33a, 33b having holes for inserting shafts therethrough at both sides on front and rear ends. Each coupling projection has a semicircular front end.

Figure 13A:
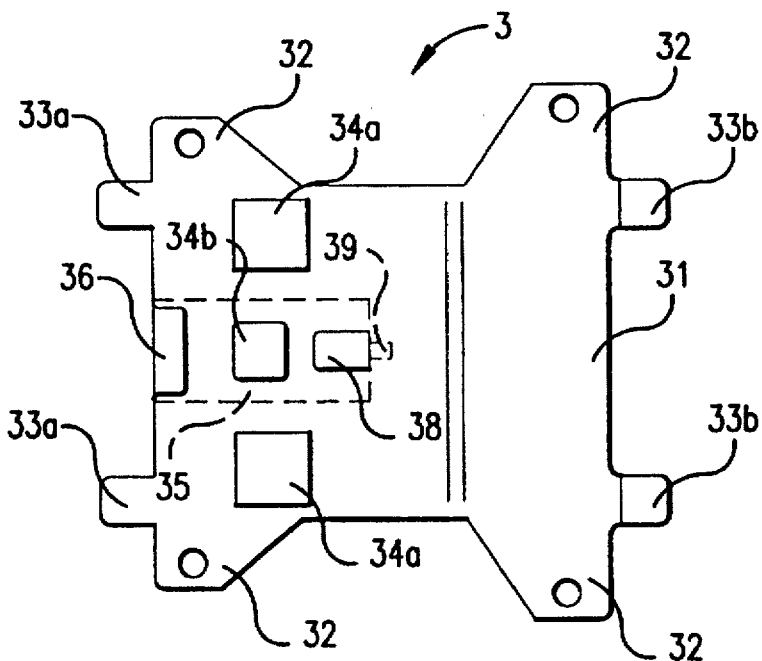
FIG. 13(A) is a plan view for showing an elevating member for constituting the pop-up unit.
Figure 13B:
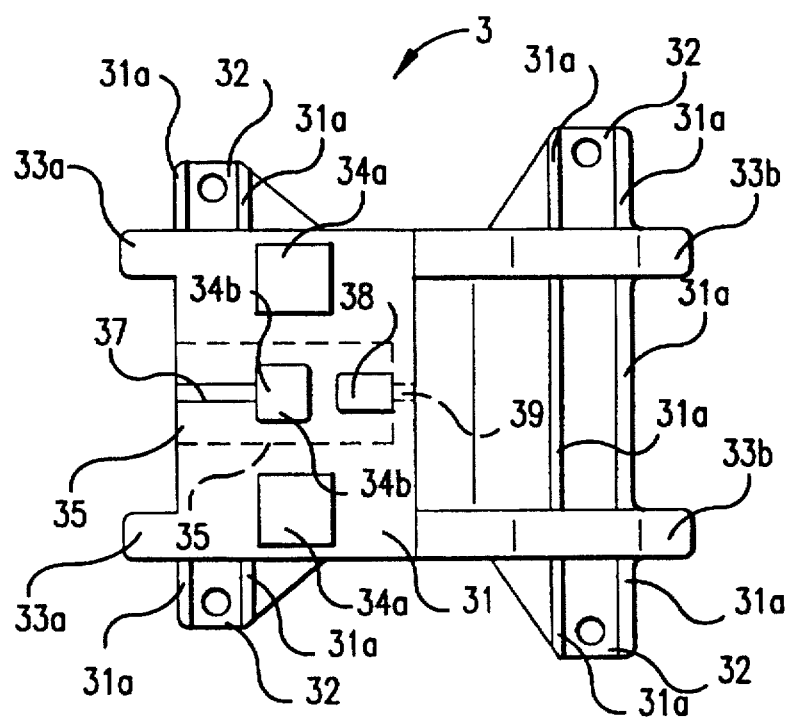
FIG. 13(B) is a bottom view thereof.
Figure 14A:
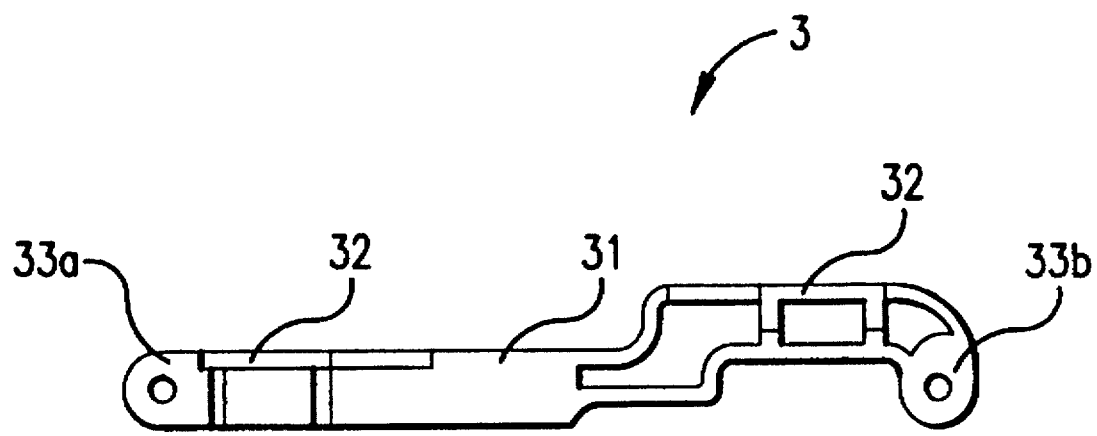
FIG. 14(A) is a side view for showing the elevating member.
Figure 14B:
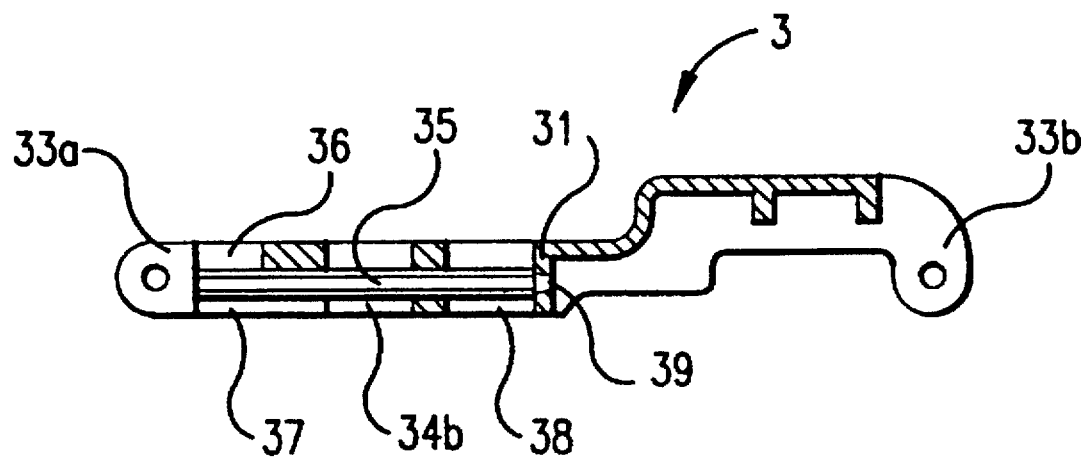
FIG. 14(B) is a sectional view thereof.
Figure 15A:
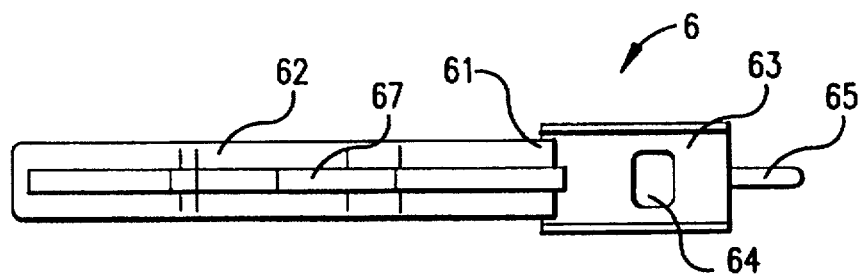
FIG. 15(A) is a plan view for showing a locking piece for constituting the pop-up unit.
Figure 15B:
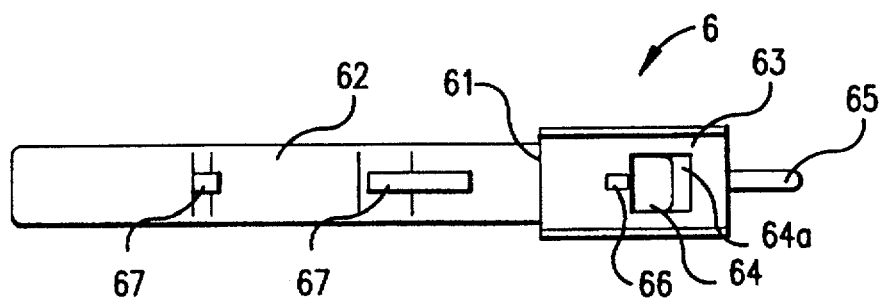
FIG. 15(B) is a bottom view thereof.
Figure 15C:
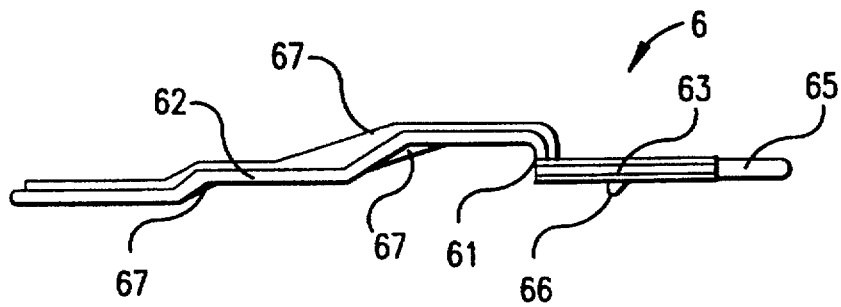
FIG. 15(C) is a side view thereof.
Figure 15D:
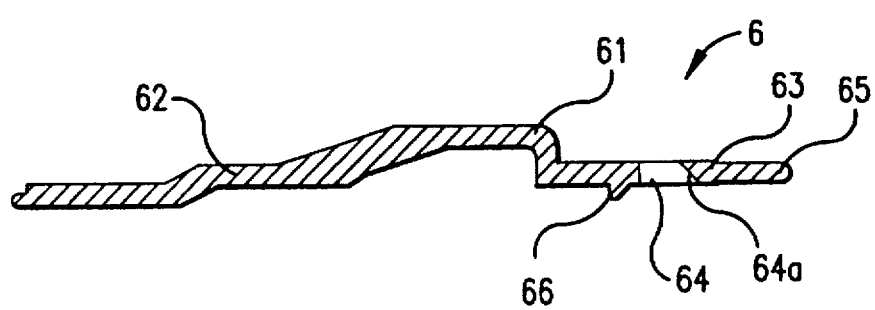
FIG. 15(D) is a sectional view thereof.

On a front portion of the plate-shape base portion 31, three engaging holes (locking dents) 34a, 34b penetrating from the front side to the back side are provided in parallel along a width direction, and the central engaging hole 34b is formed smaller than the other two engaging holes 34a. Also, at a middle of the width direction in the front portion of the plate-shape base portion 31, a bag shape locking piece receiving space 35 is formed along a longitudinal direction, and the engaging hole 34b crosses or intersects the locking piece receiving space 35. Further, at a front end of the locking piece receiving space 35, a locking piece insertion notch 36 is formed on an upper surface side of the plate-shape base portion 31, and also, at a lower side of the plate-shape base portion 31, a sliding groove 37 extending from the front end to the engaging hole 34b is formed. Also, at a rear end of the locking piece receiving space 35, a spring receiving hole 38 penetrating from the front side to the back side of the plate-shape base portion 31 is formed. At a rear wall of the spring receiving hole 38, a projection inserting hole 39 is formed. Incidentally, reference numeral 31a in FIG. 13(B) represents reinforcing ribs.

The elevating member 3 is rotatably attached to the upper ends of the supporting poles 2a, 2b by shafts 4a. Namely, each of the coupling projections 33a is inserted between the leg portion 22 of the supporting pole 2a and the shaft inserting projection 24, and each of the coupling projections 33b is inserted between the leg portion 22 of the supporting pole 2b and the shaft inserting projection 24.

In the elevating member 3, a locking piece 6 is slidably disposed in the locking piece receiving space 35.

The locking piece 6, as shown in FIGS. 15(A), 15(B), 15(C), 15(D), is a long plate-like piece bent in a crank shape at an intermediate portion thereof. A forward portion (left side in the drawing) from the crank shape bent portion 61 becomes a lock releasing piece 62, and a rear portion (right side in the drawing) from the bent portion 61 becomes a locking piece main portion 63. The locking piece main portion 63 is formed slightly wider than the lock releasing piece 62, and is provided with a locking hole 64 at a central portion thereof and a spring attaching projection 65 integrally formed therewith and projecting rearward from a rear end center in a width direction thereof. Also, at a lower surface of the locking piece main portion 63 in the center of the width direction thereof, a lock releasing projection 66 is provided to contact a forward edge of the locking hole 64. Further, the lock releasing projection 66 has a tapered surface on a rear side, and an inner edge 64a on the rear side of the locking hole 64 has also a tapered surface. Incidentally, in the drawings, reference numeral 67 is a reinforcing rib.

Figure 5:
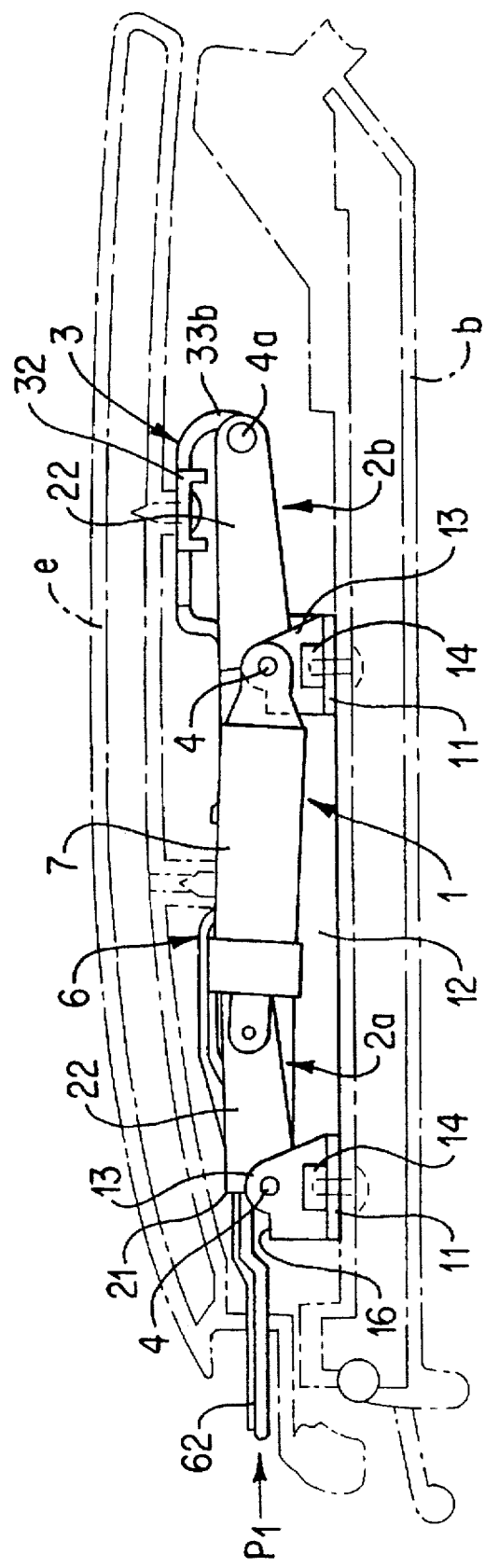
FIG. 5 is a side view for showing the folded state thereof.
Figure 6:
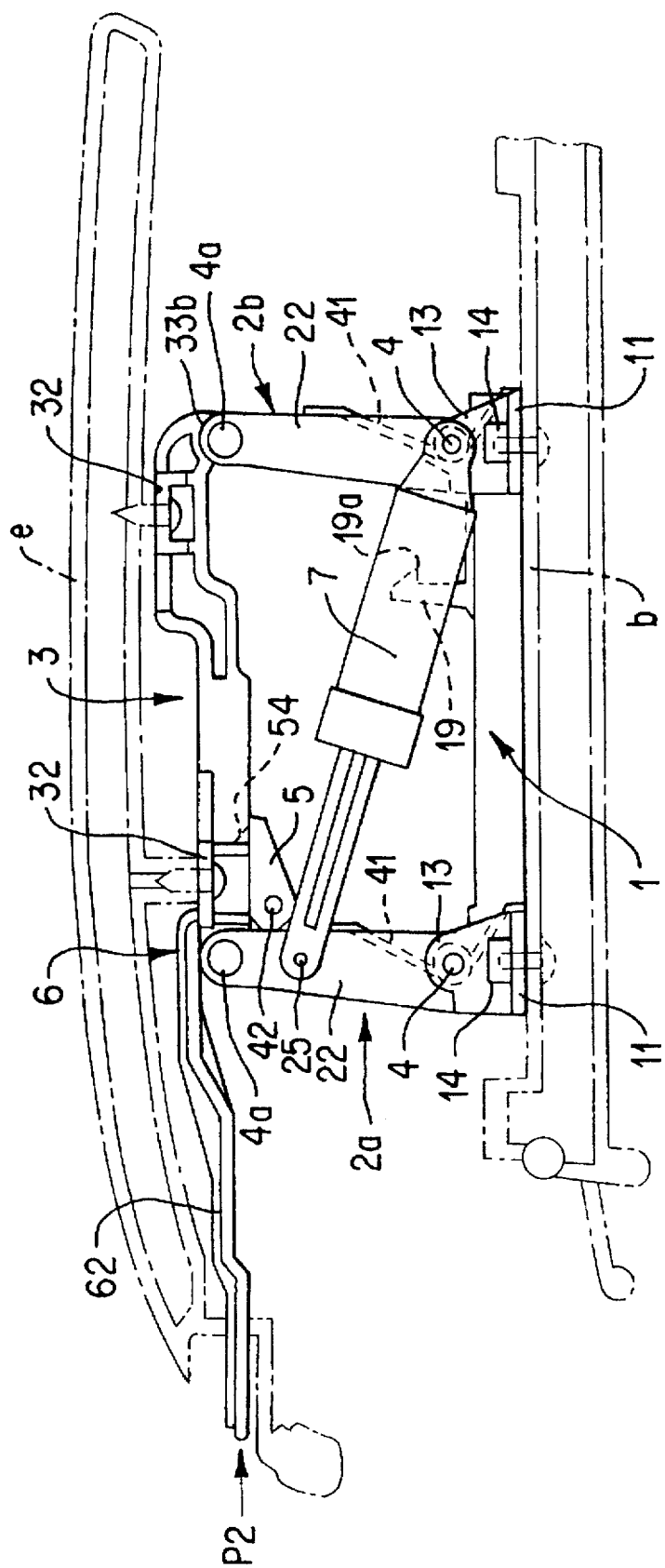
FIG. 6 is a side view for showing the pop-up state thereof.
Figure 7:
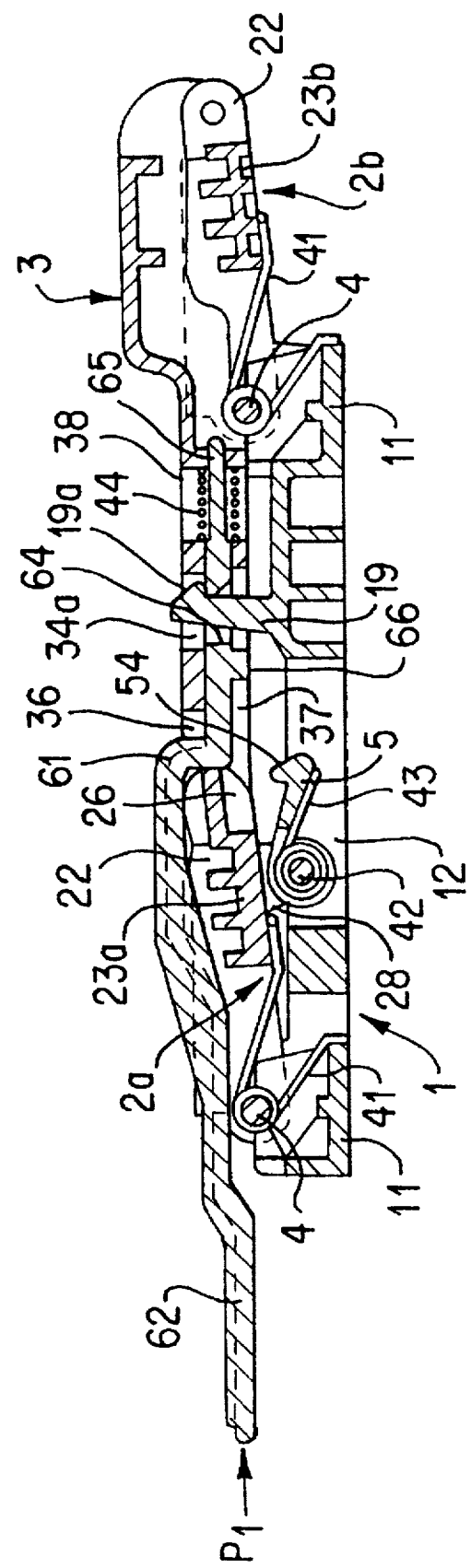
FIG. 7 is a sectional view taken along line 7—7 in FIG. 1 for showing the folded state.
Figure 8:
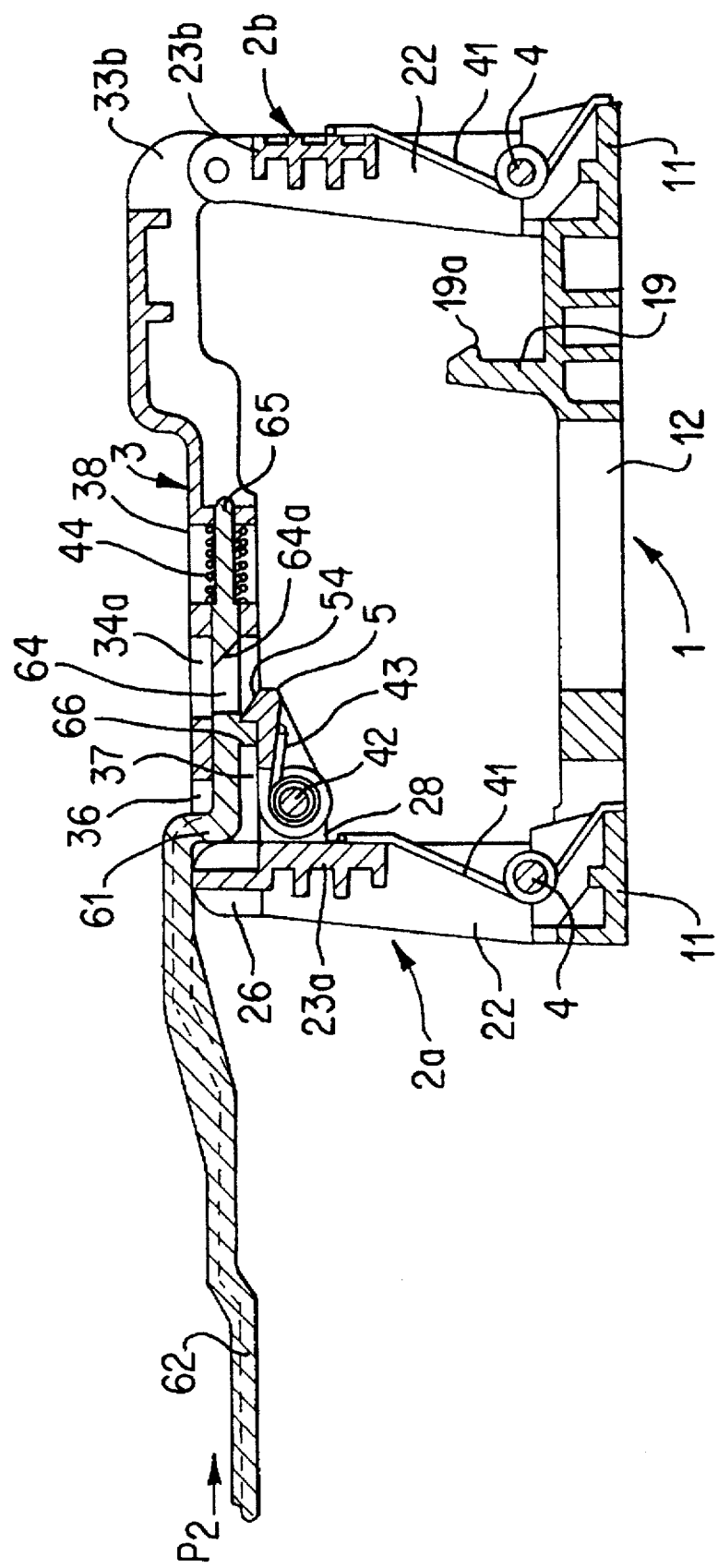
FIG. 8 is a sectional view taken along line 8—8 in FIG. 2 for showing the pop-up state.

The locking piece 6 is, as shown in FIGS. 1 to 7, attached to the elevating member 3 such that the locking piece main portion 63 is slidably held in the locking piece receiving space 35 of the elevating member 3. At this time, the lock releasing projection 66 of the locking piece 6 is inserted into the slide groove 37 of the elevating member 3, and the spring attaching projection 65 is inserted into the projection inserting hole 39 at a forward end thereof through the spring receiving hole 38 of the elevating member 3. In this state, a coil spring 44 is wound around the spring attaching projection 65 and is received in the spring receiving hole 38, so that the locking piece 6 is urged forwardly. Also, the bent portion 61 abuts against the locking piece engaging projection 26 of the supporting pole 2a, so that the locking piece main portion 63 is not extracted from the locking piece receiving space 35 of the elevating member 3, as shown in FIGS. 7 and 8. Further, the lock releasing piece 62 of the locking piece 6 projects forwardly from a front end of the elevating member 3.

The urging force for urging the locking piece 6 by the coil spring 44 is set to be weaker than those for urging the supporting poles 2a, 2b by the torsion springs 41.

With the above described structure, in the pop-up unit of the present embodiment, the main frame 1, the supporting poles 2a, 2b, and the elevating member 3 constitute a four point link mechanism, wherein with rotation of the supporting poles 2a, 2b, the elevating member 3 is elevated or lowered. In this case, in the pop-up unit of the present embodiment, as shown in FIGS. 1 to 6, between the coupling shaft 25 attached to the front supporting pole 2a and the shaft member 4 for connecting the rear supporting pole 2b and the main frame 1, a piston-type air damper 7 is disposed. Elevating and lowering movements of the elevating member 3 by rotation of the supporting poles 2a, 2b are braked by the damper 7, so that the elevating and lowering movements are carried out slowly.

The pop-up unit of the present embodiment, as described above, is incorporated between the lid b of the center console box a and the cover e thereof as shown in FIG. 23. As shown in FIGS. 5 and 6, by placing the main frame 1 on the lid b and threading screws into the screw stopping projections 14 through the lid b, the main frame 1 is fixed to the lid b, and by placing the cover e on the elevating member 3 and threading screws into the cover e through the screw holes of the attaching piece 32, the cover e is fixed to the elevating member 3, so that the pop-up unit is assembled between the lid b and the cover e. At this time, a forward end portion of the lock releasing piece 62 of the locking piece 6 projects outside the cover e through a through-hole provided in a front end portion of the cover e.

Normally, as shown in FIG. 5, both the supporting poles 2a, 2b are collapsed or located immediately over the main frame 1 against the urging forces of the torsion springs 41 to be disposed in the folded state, and the locking pawl 19a of the locking projection 19 is engaged with the locking hole 64 of the locking piece 6 for locking, as shown in FIGS. 1, 3, 5 and 7.

Figure 9B:
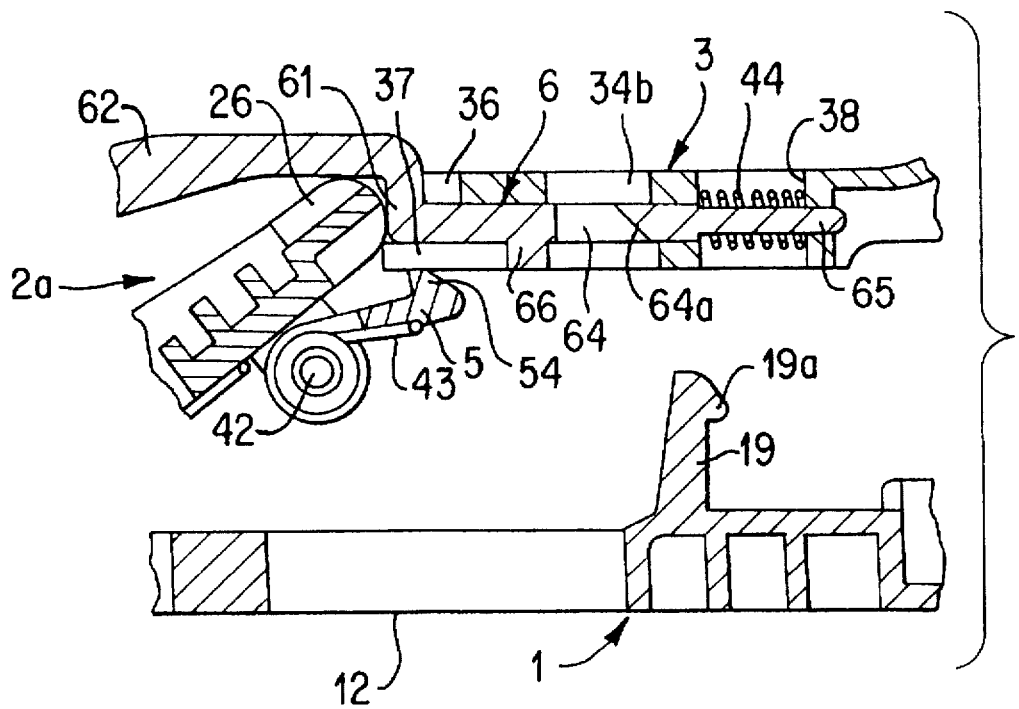

In case the pop-up unit is used as an armrest by elevating the elevating member 3 from this state, the above lock releasing piece 62 is pushed in the direction P1. Then, as shown in FIG. 9(A), the locking piece 6 slides rearwardly (right side in the drawing) to release an engaging state between the edge of the locking hole 64 provided in the locking piece 6 and the locking pawl 19a of the locking projection 19 to thereby release the locking state. As a result, both the supporting poles 2a, 2b rotate in the stand-up direction by the urging forces of the torsion springs 41, and the elevating member 3 is elevated by an action of the link mechanism. As shown in FIG. 9(B), when the supporting poles 2a, 2b rotate and come to a predetermined angle, the forward end of the locking member 5 provided on the supporting pole 2a (left side in the drawing) abuts against the lower surface of the elevating member 3.

From this state, both the supporting poles 2a, 2b further rotate in the stand-up direction by the urging forces of the torsion springs 41. In accordance with elevation of the elevating member 3, the locking member 5 is rotated downwardly against the urging force of the torsion spring 43, and the locking pawls 54 at the forward portion thereof slide rearwardly along the lower surface of the elevating member 3. When the supporting poles 2a, 2b rotate to the upright positions, the abutting steps 21 of the supporting poles 2a, 2b abut against the engaging step portions 16 of the main frame 1 to thereby stop the rotation. At this time, the respective locking pawls 54 of the locking member 5 reach the lower surface sides of the locking holes 34a, 34b, i.e., locking dents, so that the locking member 5 is rotated upwardly by the urging force of the torsion spring 43 to thereby interlock the respective locking pawls 54 with the locking holes 34a, 34b, i.e. locking dents, as shown in FIG. 8. With the rotation, as shown in FIGS. 2, 4, 6 and 8, both the supporting poles 2a, 2b become upright, and the elevating member 3 is locked in the pop-up state where the elevating member 3 is elevated from the main frame 1.

Incidentally, the rotating movements of the supporting poles 2a, 2b by the urging forces of the torsion springs 41 are slowed down by the damper 7, and the supporting poles 2a, 2b are slowly rotated to thus slowly elevate the elevating member 3.

As described above, in the pop-up unit of the present embodiment, the locking pawls 54 formed at the front end of the locking member 5 rotatably attached to the upper portion of the supporting pole 2a are locked with the locking holes 34a, 34b of the elevating member 3 to thereby lock the pop-up unit in the pop-up state, so that locking in the pop-up state can be positively carried out without wobbling.

More specifically, since locking is carried out in the pop-up state where the forward end portion of the locking member 5, one end of which is rotatably attached to the supporting pole 2a, is engaged with the lower surface of the elevating member 3, locking is performed by holding rotating movement between the elevating member 3 and the supporting pole 2a such that two points between the elevating member 3 and the supporting pole 2a away from the rotating shaft to some extent is connected. In order to provide smooth rotation or engagement at a connecting portion between the locking member 5 and the supporting pole 2a and at an engagement portion between the locking member 5 and the elevating member 3, even if some clearance is provided, wobbling at these portions are not amplified to become the wobbling of the elevating member 3. The wobbling is rather reduced to thereby cause almost no wobbling for the elevating member 3.

Further described in detail, in a four-point link mechanism, as a distance between mutually separated two points having a rotating point therebetween increases, a relative moving distance when a linking movement is carried out becomes large. In case the two points are separated to some extent, the relative moving distance between the two points becomes larger than that between two facing sides. Therefore, even if the distance between the two points is varied to some extent, the distance between the two mutually facing sides does not substantially change or change very slightly. In the locking device of the present embodiment, since the two points such as the supporting pole 2a and the elevating member 3 are mutually connected by the locking member 5, even if there is some clearance or movement between the two points, almost no wobbling is created between the elevating member 3 and the main frame 1 corresponding to the mutually facing two sides in the link mechanism.

Also, even if a force for pushing down the elevating member 3 is applied, the force is lesser concentrated between the two points, i.e. the supporting pole 2a and the elevating member 3 connected by the locking member 5, than at a point closer to the rotating shaft where a force is amplified by a lever action. Moreover, the locking member 5 for constituting the locking device of the present embodiment can be formed much stronger than the locking projection n in the conventional example. Thus, there is no fear that the locking member 5 is broken, and locking can be positively carried out in the pop-up state.

Further, in the pop-up mechanism of the present embodiment, since the urging action of the locking member 5 by the torsion spring 43, as described above, is set not to act on the whole area of 180° where the locking member 5 is rotated, but to act on the area from 0°–90° or 0°–150°, the respective locking pawls 54 abut against the lower surface of the elevating member 3 immediately before the respective locking pawls 54 of the locking member 5 engage the locking holes (locking dents) 34a, 34b of the elevating member 3. Therefore, the elevation movement of the elevating member 3 is not disturbed by frictional resistance caused when the respective locking pawls 54 are strongly urged against the lower surface of the elevating member 3 to thereby favorably carry out the elevation movement.

More specifically, although the urging force of the torsion spring 43 gradually increases as the locking member 5 is rotated downwardly against the torsion force, in the present embodiment, since the forward end portion of the locking member 5 abuts against the lower surface of the elevating member 3 immediately before the elevating movement is completed, the locking member 5 is rotated downwardly against the urging force in a range where the urging force of the spring torsion 43 is relatively small. Thus, the locking member 5 does not form large resisting force for disturbing the elevating movement of the elevating member 3.

Figure 10A:
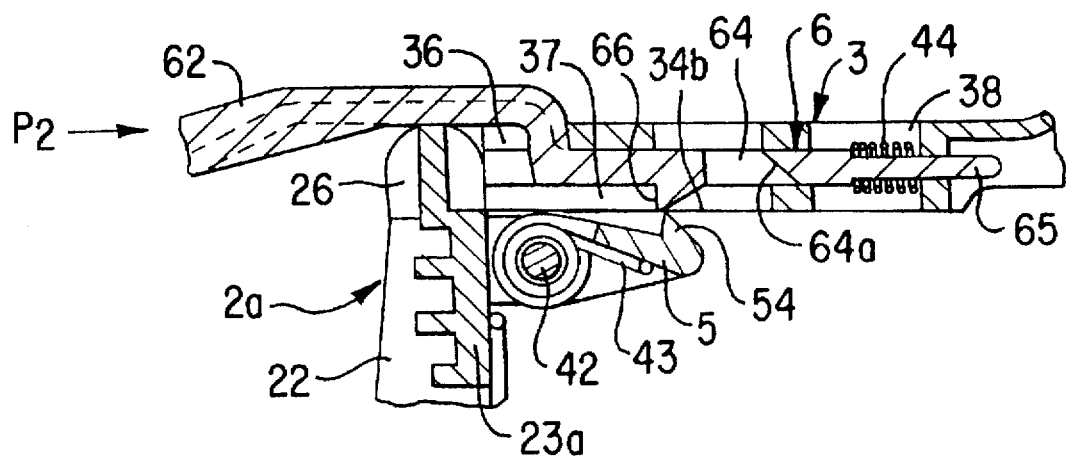
FIGS. 10(A) and 10(B) are partially enlarged sectional views for explaining intermediate movements from the pop-up state to the folded state.

Further, in case the pop-up unit is returned to the folded state as shown in FIGS. 1, 3, 5 and 7 from the pop-up state as shown in FIGS. 2, 4, 6 and 8 by pushing down the elevating member 3, the lock releasing piece 62 is pushed in the direction P2 again, as shown in FIGS. 2, 4, 6 and 8, and the locking piece 6 is slid rearwardly (right side in the drawings) as shown by FIG. 10(A). Through this sliding movement, the lock releasing projection 66 provided on the locking piece 6 is moved rearwardly in the projection sliding groove 37 of the elevating member 3 to thereby enter into the locking hole 34b, and abuts against the locking pawl 54 of the locking member 5 engaged with the edge of the locking hole 34b. As a result, the forward end of the locking member 5 is pressed downwardly to rotate by the action of the tapered surface at the forward end of the lock releasing projection 66 to thereby release the engaging state between the locking pawls 54 of the locking member 5 and the locking holes 34a, 34b of the elevating member 3, thus releasing the locking state by the locking member 5.

Figure 10B:
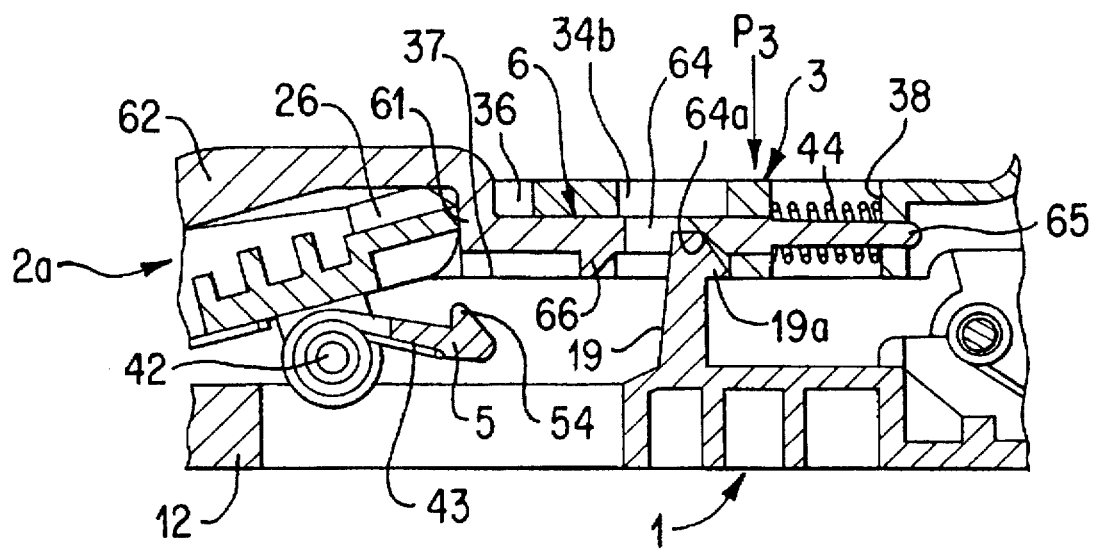
Figure 11A:
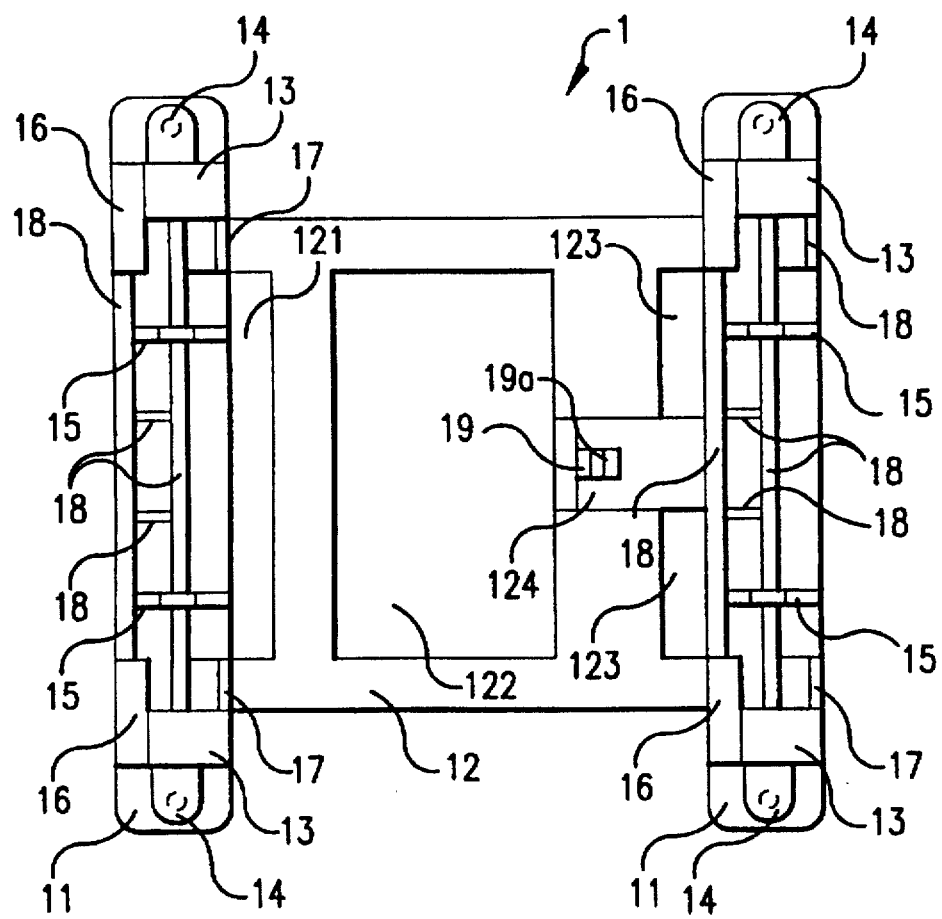
FIG. 11(A) is a plan view for showing a main frame for constituting the pop-up unit.
Figure 11B:
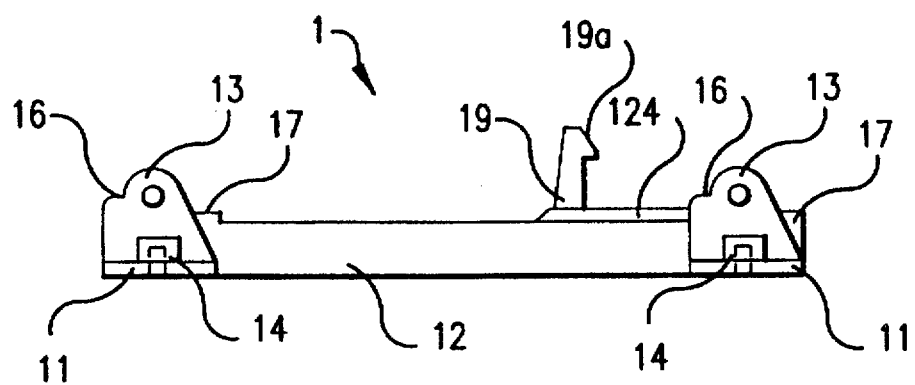
FIG. 11(B) is a side view thereof.
Figure 12A:
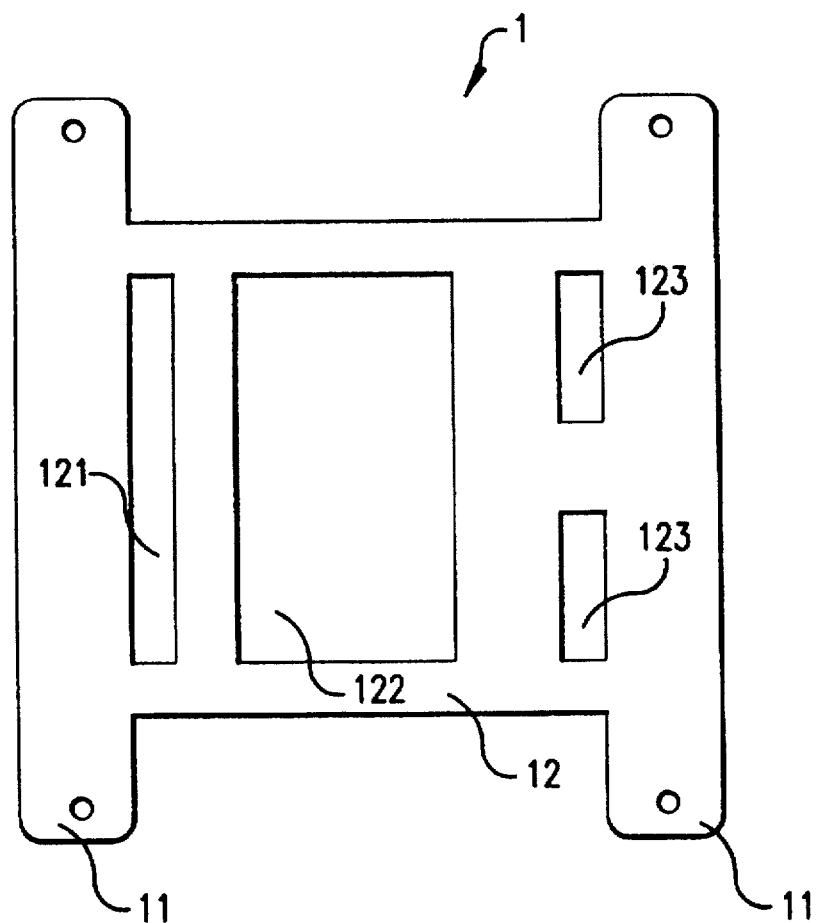
FIG. 12(A) is a bottom view for showing the main frame.
Figure 12B:
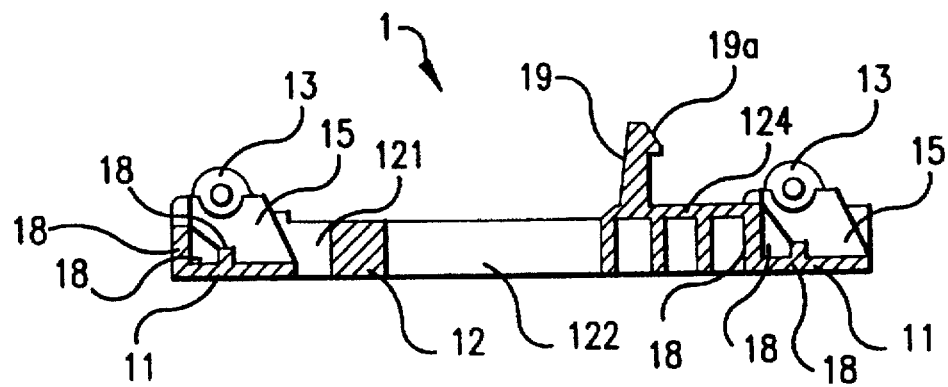
FIG. 12(B) is a sectional view thereof.

In this state, the elevating member 3 is pressed downwardly while both the supporting poles 2a, 2b are rotated rearwardly by the action of the link mechanism to thereby collapse or fold the elevating member 3. As shown in FIG. 10(B), as the elevating member 3 is rotated, a forward or upper end portion of the locking projection 19 of the main frame 1 abuts against the tapered portion 64a formed in an inner periphery at the rear edge of the locking hole 64 of the locking piece 6 which has moved forwardly (left side in the drawings) by releasing the pushing power in the direction P2. In this state, when the elevating member 3 is further pushed in the direction P3, i.e. downwardly, the locking piece 6 once slides rearwardly by the action of the tapered portion 64a, and after the locking projection 19 enters into the locking hole 64, the locking piece 6 again slides forwardly by the urging force of the coil spring 44. Thus, as shown in FIG. 7, the locking pawl 19a of the locking projection 19 engages the locking hole 64 to thereby lock in the folded state as shown in FIGS. 1, 3, 5 and 7.

As described above, in the pop-up unit of the present embodiment, the locking member 5 for locking in the pop-up state is pushed by the lock releasing projection 66 projecting from the locking piece 6 which is slidably attached to the elevating member 3, to thereby rotate the locking member 5 against the urging force of the torsion spring 43, so that the engaging state between the locking member 5 and the elevating member 3 is released. Therefore, in the pop-up state, even if a force for pressing down the elevating member 3 is applied thereto, the sliding movement of the locking piece 6 is not disturbed or affected, so that the locking state can be easily and positively released.

More specifically, in the pop-up unit of the present embodiment, as described above, by sliding the locking piece 6 and causing the lock releasing projection 66 projecting from the locking piece 6 to abut against the forward end of the locking member 5 to thereby press down the locking member 5, the locking member 5 is rotated against the urging force of the torsion spring 43 and the engaging state of the locking pawls 54 at the forward end portion of the locking member 5 and the locking holes (locking dents) 34a, 34b of the elevating member 3 is released. Therefore, even if a force for pressing down the elevating member 3 is applied, the locking action is carried out between the locking member 5 and the elevating member 3, and the locking piece 6 for carrying out the lock releasing operation is not involved in the locking action or engagement. Therefore, the sliding movement of the locking piece 6 is not blocked by the force for pressing down the elevating member 3. Thus, the locking piece 6 can slide smoothly, and the lock releasing operation can be easily and positively carried out.

In the pop-up unit of the present embodiment, as described above, since the urging force for urging the locking piece 6 in the forward sliding direction by the coil spring 44 is set to be weaker than those of the torsion springs 41 for urging the supporting poles 2a, 2b in the stand-up direction, the lock releasing operation from the pop-up state can be smoothly carried out.

Namely, by pushing the locking piece in the pop-up state in the direction P2, the locking piece 6 is slid rearwardly against the urging force by the coil spring 44, which also causes the elevating member 3 to be pushed rearwardly and at the same time generates a force for rotating the supporting poles 2a, 2b in the collapsing direction. At this time, in case the urging force by the coil spring 44 for urging the locking piece 6 is strong, before the locking piece 6 makes a rearward sliding movement against the urging force, forces greater than the urging force by the torsion springs 41 are applied to the supporting poles 2a, 2b to thereby attempt to rotate the supporting poles 2a, 2b. Therefore, forces are applied to the engaging portions between the respective locking pawls 54 in the locking member 5 and locking holes 34a, 34b in the elevating member 3, which stop the rotation of the supporting poles 2a, 2b, so that the lock releasing operation may not be carried out smoothly.

However, in the present embodiment, since the urging force for urging the locking piece 6 by the coil spring 44 is set to be weaker than those for urging the supporting poles 2a, 2b by the torsion springs 41, before the forces for rotating the supporting poles 2a, 2b are generated, the locking piece 6 can be positively slid rearwardly against the urging force by the coil spring, and the lock releasing operation can be smoothly and positively performed.

As described above, according to the pop-up mechanism of the invention, in the pop-up state where the supporting poles 2a, 2b stand up and the elevating member 3 is situated at the upper limit, locking is positively carried out without wobbling. Moreover, from this state, the lock releasing operation can be easily and positively carried out.

Figure 19:
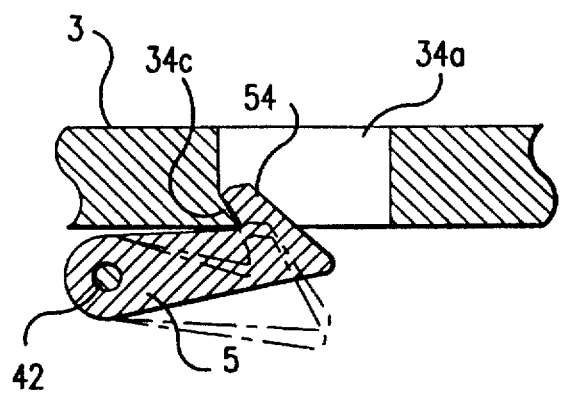
FIG. 19 is an enlarged sectional view for explaining another example of the locking pawl in the locking member for constituting the pop-up mechanism.

Incidentally, the pop-up mechanism according to the present invention is not limited to the above embodiment, and can be changed as desired. For example, as shown in FIG. 19, the locking pawls 54 in the locking member 5 may be inclined inwardly, and at the lower edge portions of the locking holes 34a, 34b (only locking hole 34a being shown in the drawing) in the elevating member 3 to be engaged with the locking pawls 54, engaging projections 34c corresponding to the inclinations of the locking pawls 54 may be provided, so that by engaging the locking pawls 54 and the engaging projections 34c, the locking in the pop-up state can be strengthened. Accordingly, even if a strong force is applied to the elevating member 3 in the pop-up state, the locking pawls 54 are positively prevented from being extracted from the locking holes 34a, 34b by the engaging projections 34c to thereby improve reliability of the locking state.

In this case, an inclination of the locking pawl 54 shown in FIG. 19 is set to coincide with a rotating path of the forward end of the locking member 5, and the engaging projection 34c is formed to correspond to the inclination of the locking pawl 54. Also, as described above, the urging force for urging the locking piece 6 by the coil spring 44 is set to be weaker than those for urging the supporting poles 2a, 2b by the torsion springs 41. Thus, as shown by dot-dash lines in FIG. 19, when the locking is released by rotating the locking member 5, the locking pawls 54 are not caught by the engaging projections 34c to thereby smoothly release the locking.

Figure 18A:
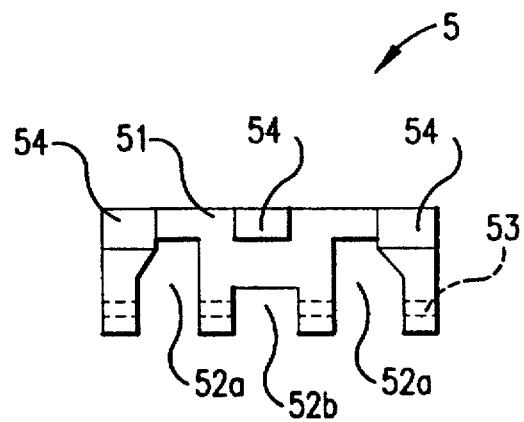
FIG. 18(A) is a plan view for showing a locking member for constituting the pop-up unit.
Figure 18B:
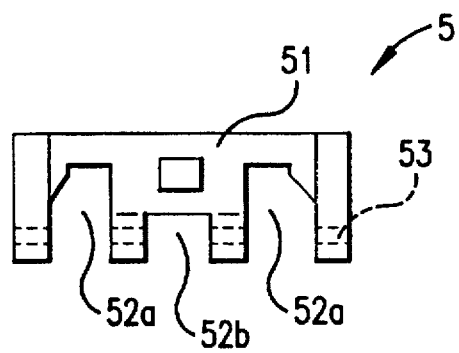
FIG. 18(B) is a bottom view thereof.
Figure 18C:
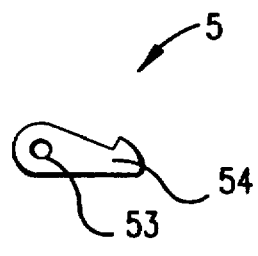
FIG. 18(C) is a side view thereof.
Figure 18D:
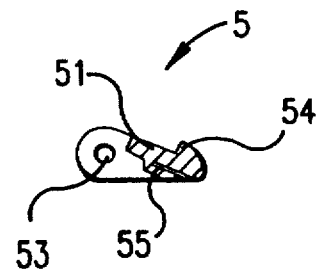
FIG. 18(D) is a sectional view thereof.
Figure 20A:
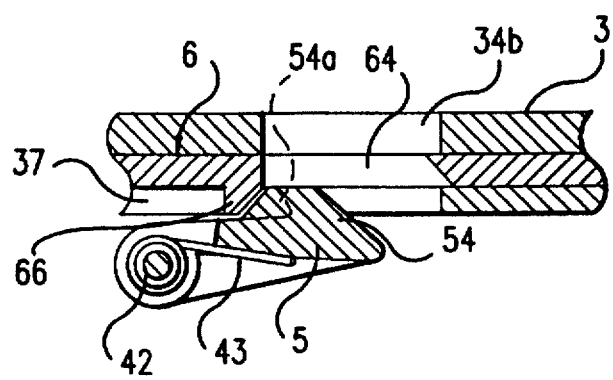
FIG. 20(A) is an enlarged section view, in a locked state, for explaining the another example of the locking member.
Figure 20B:
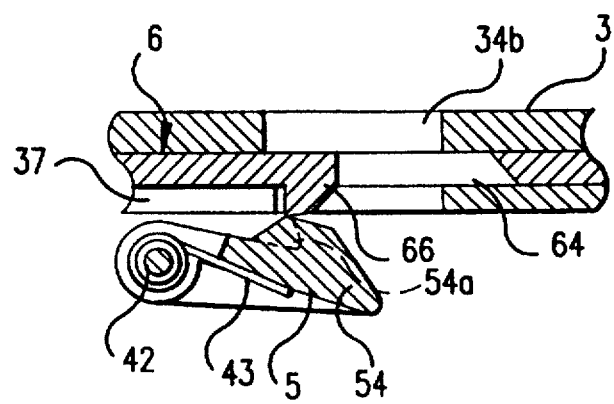
FIG. 20(B) is an enlarged sectional view when the locking state is released.

Also, the locking pawl 54 in the middle of the locking member 5 as shown in FIG. 18(A) may be provided with a taper shape wall (hereinunder referred to as "tapered wall") 54a to be inserted into a projection sliding groove 37 formed on an under surface of the elevating member 3 as shown in FIGS. 20(A) and 20(B), so that the tapered surface of the lock releasing projection 66 and the tapered wall 54a function to smoothly release the locking.

Further, in the above embodiment, the piston-type air damper 7 was used as a control device for controlling an elevating speed of the elevating member 3. However, in the air damper, there is an idle section where a damping effect is not exhibited at an initial operation. Also, a diagonal line of the four-point link for connecting the air damper does not become long or expand at a constant rate until the four point link stands up from the folded state, but the expanding rate of the diagonal line at an initial operation is small and becomes greater at a last operation. Therefore, the damping effect of the air damper 7 is weak at the initial operation, and becomes strong at the last operation, so that the pop-up operation may comprise two steps.

Figure 22A:
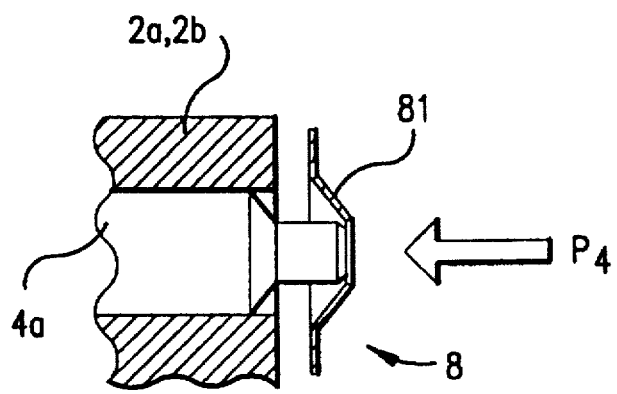
FIG. 22(A) is a sectional view, prior to an engagement, for showing an example of a structure for fixing a shaft by using the push nut.
Figure 22B:
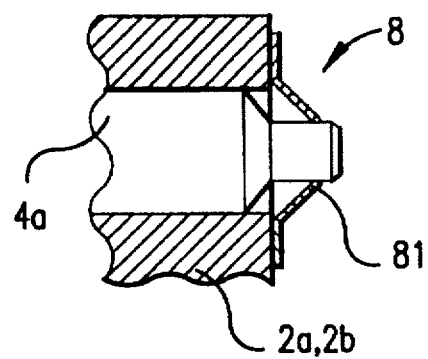
FIG. 22(B) is a sectional view after the engagement thereof.

Therefore, in such a case, the shafts 4a for connecting the elevating member 3 and the supporting poles 2a, 2b are fixed to the connecting projections 33a, 33b of the elevating member 3 by, for example inserting under pressure, and the shafts 4a are rotatably inserted into the upper edges of the pole-shape leg portions 22 of the supporting poles 2a, 2b and the shaft insertion projections 24, so that the elevating member 3 and the supporting poles 2a, 2b are rotatably connected. Under this state, both ends or one end of each of the shafts 4a, as shown in FIG. 22(A) and 22(B), are fixed by push nuts 8. Accordingly, a constant damping effect can be obtained through a friction resistance generated between the push nuts 8 and the supporting poles 2a, 2b to thereby supplement the damping effect by the air damper 7.

Figure 21:
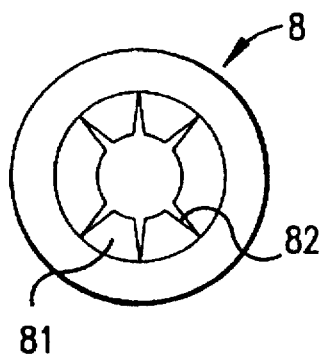
FIG. 21 is a plan view for showing an example of a push nut to be used in the pop-up mechanism.

More specifically, the push nut 8, as shown in FIG. 21, has a ring shape where a central portion thereof expands in a dome shape, and a plurality of slits 82 is radially formed on the expanded portion 81. The push nut 8 is made of steel having a strong repellent elasticity. The push nut 8, as shown in FIG. 22(A), is placed on a forward end of the shaft 4a projecting from the side surface of the supporting pole 2a or 2b, and by strongly pushing the expanded portion 81 in the direction P4, as shown in FIG. 22(B), the expanded portion 81 is engaged with the forward end of the shaft 4a in a bent state. Therefore, there is formed a state where the shaft 4a is strongly pulled by the push nut 8, and by the reaction thereof, an inner surface of a circumferential edge of the push nut 8 is strongly pressed against the supporting pole 2a or 2b.

In this case, since the shaft 4a, as described above, is fixed to the elevating member 3, when the elevating member 3 is elevated or lowered, the shaft 4a is rotated with respect to the supporting pole 2a or 2b, and the push nut 8 rotates together with the shaft 4a. At this time, the inner surface of the circumferential edge of the push nut 8 slides along a side surface of the supporting pole 2a or 2b in a press contact state, and by friction resistance thereof, the damping effect is generated. The damping effect by the friction resistance is always constant to thereby effectively supplement the damping effect by the air damper 7 and to positively obtain good and smooth pop-up movement. Also, the push nut 8, as described above, creates the state where the shaft 4a is pulled by the strong repellent elasticity, so that it is possible to prevent the shaft 4a from wobbling as well as effectively prevent the elevating member 3 from wobbling in the left and right directions and the front and rear directions.

Incidentally, in the above embodiment, although two shafts 4a connect a forward end of the elevating member 3 and the supporting pole 2a, and a rear end of the elevating member 3 and the supporting pole 2b, respectively, one shaft may be used to connect them. Also, in FIGS. 19 to 22(B), since the structures other than the above described structure are the same as the pop-up mechanism explained in the first embodiment, the same symbols are assigned to the same parts or portions, and the descriptions thereof are omitted.

Further, instead of the piston-type air damper 7, the elevating movement may be braked by damper mechanisms other than the piston-type air damper, such as a reduction device using gears, or a braking mechanism, such as the damper, may also be omitted. Also, the shapes of the main frame 1, supporting poles 2a, 2b, elevating member 3, locking piece 6 and the like may be changed as desired, and the other structures may also be changed provided that they do not exceed the gist of the present invention.

Further, while the pop-up mechanism of the present invention is preferably used as an elevating device of an armrest formed on a center console box of a vehicle, the pop-up mechanism of the present invention is not limited to this use. The pop-up mechanism can be used as a mechanism for changing a relative positional relationship for armrests of various chairs or articles requiring change of a relative positional relationship between a main frame and a part fixed thereto according to its using mode.

As described above, according to the pop-up mechanism of the present invention, problems, such as generation of wobbling and operational defects, due to a locking device in the conventional mechanism, can be eliminated. Also, in the pop-up state where the supporting poles stand up on the main frame and the elevating member is situated at the upper limit, locking can be positively carried out without wobbling, and further, from the locking state in the pop-up state, the locking can be easily and positively released.

While the invention has been explained with reference to the specific embodiment of the invention, the explanation is illustrative and the invention is limited only by the appended claims.

What is claimed is:

1. A pop-up mechanism comprising, a main frame having an upper surface;

a plurality of supporting poles, each pole having one end rotatably coupled to the main frame and collapsibly disposed over the upper surface of the main frame;

an elevating member rotatably attached to the other end of each of the supporting poles and having a locking dent and a lower surface;

a first urging device for urging the supporting poles to rotate in a stand-up direction oriented perpendicular to the main frame; and a locking device for locking the supporting poles in a folded state where the supporting poles are folded over the main frame and a pop-up state where the supporting poles stand up on the main frame, said locking device including a locking piece slidably attached to the elevating member and having a lock releasing projection extending toward the main frame and a locking hole; a second urging device for urging said locking piece in one direction attached to the locking piece; a locking member rotatably attached to one of the supporting poles and having at least one locking pawl at a forward end thereof to engage the locking dent of the elevating member, said locking member being urged toward the elevating member; and a locking projection projecting from the main frame toward the elevating member and having a locking pawl at a forward end portion thereof, said locking pawl of the locking projection engaging an edge of the locking hole of the locking piece to lock the elevating member in the folded state, said locking piece being slidable to release an engaging state between the edge of the locking hole and the locking pawl of the locking projection, said locking pawl of the locking member engaging the locking dent of the elevating member to lock the elevating member in the pop-up state, said locking piece being slidable so that when the locking piece is pushed, the lock releasing projection of the locking piece abuts against and pushes the locking member to rotate against an urging force, to release the locking pawl of the locking member from the locking dent of the elevating member.

2. A pop-up mechanism as claimed in claim 1, wherein said second urging device has a force weaker than a force of the first urging device so that when the locking piece is pushed in the pop-up state, the engaging state is released first and then the supporting poles moved to the folded state.

3. A pop-up mechanism as claimed in claim 1, further comprising a damping device for braking a rotating movement of the supporting poles situated between one of the supporting poles and the main frame.

4. A pop-up mechanism as claimed in claim 1, wherein said locking device further includes a torsion spring for urging the locking member to rotate toward the elevating member, a rotating range of the locking meter by the torsion spring being less than 180° so that when the folded state is changed to the pop-up state by rotating the supporting poles, urging force of the torsion spring acts immediately before a forward end portion of the locking pawl engages the locking dent of the elevating member.

5. A pop-up mechanism as claimed in claim 4, wherein said rotating range of the locking member is less than 150°.

6. A pop-up mechanism as claimed in claim 4, wherein said locking member is rotationally attached to the supporting pole below the other end of the supporting pole and urged toward the elevating member by the torsion spring.

7. A pop-up mechanism as claimed in claim 4, wherein said locking member includes a plurality of said locking pawls extending in a direction parallel to the supporting poles to securely hold the elevating member.

8. A pop-up mechanism as claimed in claim 1, wherein said at least one locking pawl has an inwardly inclined edge, and the edge of the locking hole has an inclination corresponding to the inwardly inclined edge of the locking pawl.

9. A pop-up mechanism as claimed in claim 8, wherein said locking member has a tapered wall so that the tapered wall can be smoothly pushed by the lock leasing projection.

* * * * *